United States Patent
Harutyunyan et al.

(10) Patent No.: US 12,056,002 B2
(45) Date of Patent: Aug. 6, 2024

(54) METHODS AND SYSTEMS FOR USING MACHINE LEARNING TO RESOLVE PERFORMANCE PROBLEMS WITH OBJECTS OF A DATA CENTER

(71) Applicant: VMware LLC, Palo Alto, CA (US)

(72) Inventors: Ashot Nshan Harutyunyan, Yerevan (AM); Arnak Poghosyan, Yerevan (AM); Lilit Harutyunyan, Yerevan (AM); Nelli Aghajanyan, Yerevan (AM); Tigran Bunarjyan, Yerevan (AM); Marine Harutyunyan, Yerevan (AM); Sam Israelyan, Yerevan (AM)

(73) Assignee: VMware LLC, Palo Alto, CA (US)

( * ) Notice: Subject to any disclaimer, the term of this patent is extended or adjusted under 35 U.S.C. 154(b) by 7 days.

(21) Appl. No.: 18/096,752

(22) Filed: Jan. 13, 2023

(65) Prior Publication Data

US 2024/0028444 A1   Jan. 25, 2024

Related U.S. Application Data

(63) Continuation-in-part of application No. 17/871,080, filed on Jul. 22, 2022.

(51) Int. Cl.
  *G06F 11/07*   (2006.01)
  *G06N 7/01*    (2023.01)
  *G06N 20/20*   (2019.01)

(52) U.S. Cl.
  CPC ........ *G06F 11/079* (2013.01); *G06F 11/0721* (2013.01); *G06F 11/0769* (2013.01); *G06N 7/01* (2023.01); *G06N 20/20* (2019.01)

(58) Field of Classification Search
  CPC .............. G06F 11/079; G06F 11/3034; G06F 11/3447; G06F 11/0727; G06F 11/0766
  See application file for complete search history.

(56) References Cited

U.S. PATENT DOCUMENTS

| | | | |
|---|---|---|---|
| 9,069,737 B1 * | 6/2015 | Kimotho | G06F 11/079 |
| 2020/0117529 A1 * | 4/2020 | Qiao | G06T 19/006 |
| 2022/0214936 A1 * | 7/2022 | Le | G06N 5/01 |
| 2022/0382784 A1 * | 12/2022 | Osuala | G06F 16/285 |
| 2023/0205618 A1 * | 6/2023 | Xue | G06F 11/0709 |
| | | | 714/37 |

FOREIGN PATENT DOCUMENTS

WO   WO-2020240680 A1 * 12/2020 .......... G06F 11/0709

* cited by examiner

*Primary Examiner* — Yolanda L Wilson
(74) *Attorney, Agent, or Firm* — Quarles & Brady LLP

(57) ABSTRACT

Automated computer-implemented methods and systems for resolving performance problems with objects executing in a data center are described. The automated methods use machine learning to obtain rules defining relationships between probabilities of event types of in log messages and performance problems identified by a key performance indictor ("KPI") of the object. When a KPI violates a corresponding threshold, the rules are used to evaluate run time log messages that describe the probable root cause of the performance problem. An alert identifying the KPI threshold violation, and the log messages are displayed in a graphical user interface of an electronic display device.

15 Claims, 35 Drawing Sheets

```
log.write([$Time_date] [Thread-$X/$IP/INFO]
[com.vmware.loginsight.commons.executor.ProcessExecutor] [ [[/usr/lib/loginsight/application/
lib/apache-cassandra-2.0.10/bin/nodetool, -h, montools-prod-loginsight.vmware.com, repair]]
[$Time_date] Repair session $RS for range $range finished)
```

FIG. 6

```
[2019-03-10 23:43:36.859+0000] [Thread-1822496/127.0.0.1 INFO]
[com.vmware.loginsight.commons.executor.ProcessExecutor] i [[/usr/lib/loginsight/application/
lib/apache-cassandra-2.0.10/bin/nodetool, -h, montools-prod-loginsight.vmware.com, repair]]
[2015-03-10 23:43:36,716] Repair session 51312720-c77e-11e4-ad72-4769d614a3f2 for range
(-6899937477723537626, -6896547230076663429) finished]
```

FIG. 7

| Regular Expression (Regex) ⟵ 904 | Log message strings ⟵ 902 |
|---|---|
| 912 — [0-9]{4}/[0-9]{2}/[0-9]{2}<br>　　　　914　915　916<br>[0-9]{1,3}\.[0-9]{1,3}\.[0-9]{1,3}\.[0-9]{1,3} | yyyy/mm/dd ⟵ 906<br>　　908 909 910<br>General IP address from 0.0.0.0 to 999.999.999.999 |
| 920 — (?<![0-9])(?:<br>(?:25[0-5]\|2[0-4][0-9]\|[0-1]?[0-9]{1,2})[.]<br>(?:25[0-5]\|2[0-4][0-9]\|[0-1]?[0-9]{1,2})[.]<br>(?:25[0-5]\|2[0-4][0-9]\|[0-1]?[0-9]{1,2})[.]<br>(?:25[0-5]\|2[0-4][0-9]\|[0-1]?[0-9]{1,2})<br>)(?![0-9]) | IP version 4 (IPv4) address from 0.0.0.0 to 255.255.255.255 |
| 924 — (?<![0-9])(?>[+-]?(?:(?:[0-9]+(?:\.[0-0]+)?)\|(?:\.[0-9]+))) | Base 10 number |
| 926 — [a-zA-Z0-9._-]+ | Upper/lower case letters, numbers, underscore, and hyphen (e.g., username) |
| 928 — [a-zA-Z0-9._%+-]+@[a-zA-Z0-9.-]+\.[a-zA-Z]{2,4} | General email address |

FIG. 9A

| Grok pattern — 932 | Regular Expression (Regex) — 934 |
|---|---|
| INT | (?:[+-]?(?:[0-9]+)) |
| POSINT | \b(?:[1-9][0-9]*)\b |
| BASE10NUM | (?<![0-9.+-])(?>[+-]?(?:(?:[0-9]+(?:\.[0-9]+)?)\|(?:\.[0-9]+))) |
| USERNAME — 936 | [a-zA-Z0-9._-]+ —— 938 |
| YEAR | (?>\d\d){1,2} |
| MONTH | \b(?:Jan(?:uary)?\|Feb(?:ruary)?\|Mar(?:ch)?\|Apr(?:il)?\|May\|Jun(?:e)?\|Jul(?:y)?\|Aug(?:ust)?\|Sep(?:tember)?\|Oct(?:ober)?\|Nov(?:ember)?\|Dec(?:ember)?)\b |
| MONTHNUM | (?:0?[1-9]\|1[0-2]) |
| DAY | (?:Mon(?:day)?\|Tue(?:sday)?\|Wed(?:nesday)?\|Thu(?:rsday)?\|Fri(?:day)?\|Sat(?:urday)?\|Sun(?:day)?) |
| HOUR | (?:2[0123]\|[01]?[0-9]) |
| MINUTE | (?:[0-5][0-9]) |
| SECOND | (?:(?:[0-5][0-9]\|60)(?:[:.,][0-9]+)?) |
| EMAILLOCALPART | [a-zA-Z][a-zA-Z0-9_.+-=:]+ |
| IPV4 | (?<![0-9])(?:(?:25[0-5]\|2[0-4][0-9]\|[0-1]?[0-9]{1,2})[.](?:25[0-5]\|2[0-4][0-9]\|[0-1]?[0-9]{1,2})[.](?:25[0-5]\|2[0-4][0-9]\|[0-1]?[0-9]{1,2})[.](?:25[0-5]\|2[0-4][0-9]\|[0-1]?[0-9]{1,2})(?![0-9]) |
| HOSTNAME — 940 | \b(?:[0-9A-Za-z][0-9A-Za-z-]{0,62})(?:\.(?:[0-9A-Za-z][0-9A-Za-z-]{0,62}))*(\.?\|\b) — 942 |
| SPACE | \s* |

FIG. 9B

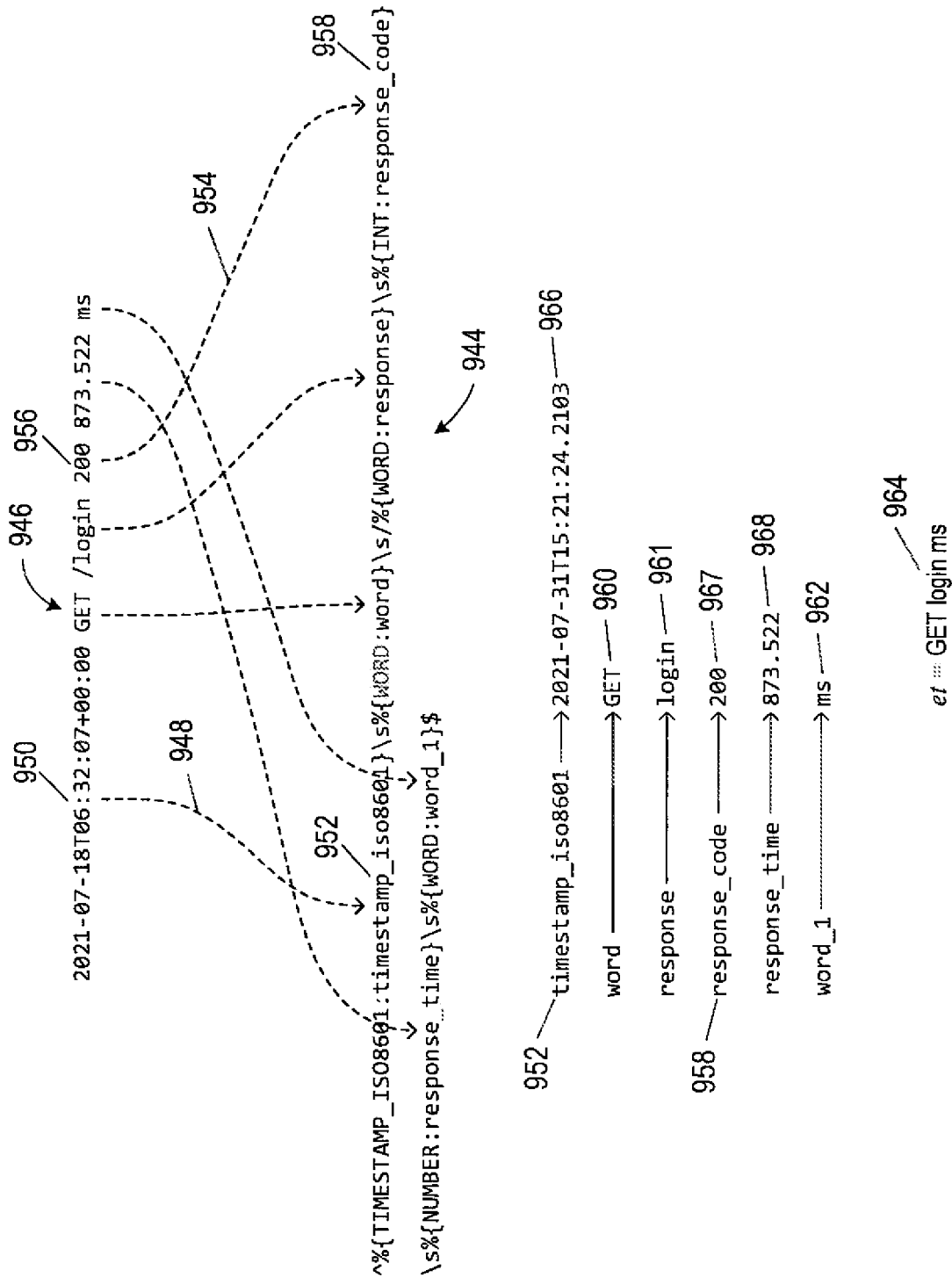

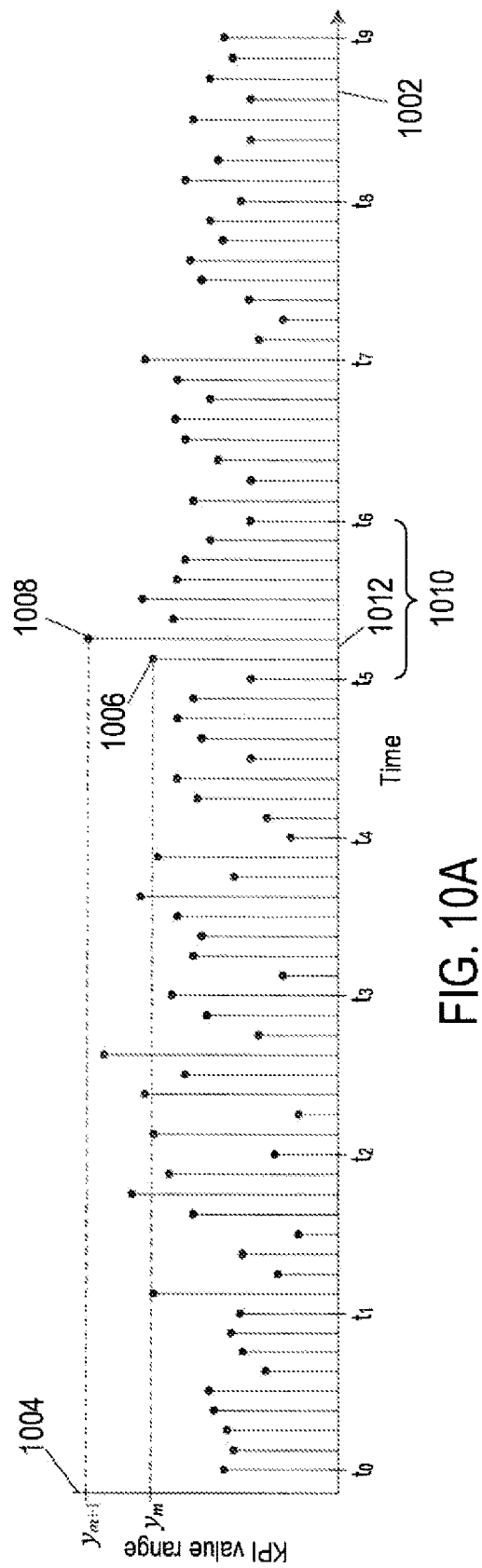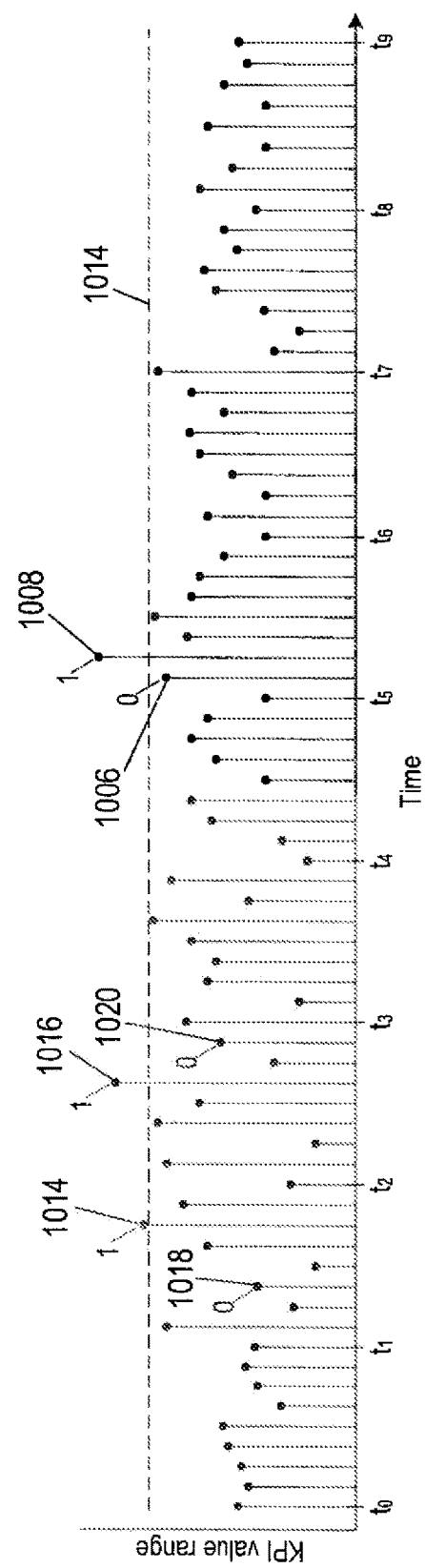

| $et_2$ | $et_5$ | $et_{14}$ | $et_{23}$ | $et_{41}$ | $et_{49}$ | label |
|---|---|---|---|---|---|---|
| $p_{12}$ | $p_{15}$ | $p_{1,14}$ | $p_{1,23}$ | $p_{1,41}$ | $p_{1,49}$ | 0 |
| $p_{22}$ | $p_{25}$ | $p_{2,14}$ | $p_{2,23}$ | $p_{2,41}$ | $p_{2,49}$ | 1 |
| $p_{22}$ | $p_{25}$ | $p_{2,14}$ | $p_{2,23}$ | $p_{2,41}$ | $p_{2,49}$ | 1 |
| $p_{42}$ | $p_{45}$ | $p_{4,14}$ | $p_{4,23}$ | $p_{4,41}$ | $p_{4,49}$ | 0 |
| $p_{52}$ | $p_{55}$ | $p_{5,14}$ | $p_{5,23}$ | $p_{5,41}$ | $p_{5,49}$ | 0 |
| $p_{72}$ | $p_{75}$ | $p_{7,14}$ | $p_{7,23}$ | $p_{7,41}$ | $p_{7,49}$ | 0 |
| $p_{72}$ | $p_{75}$ | $p_{7,14}$ | $p_{7,23}$ | $p_{7,41}$ | $p_{7,49}$ | 0 |
| $p_{72}$ | $p_{75}$ | $p_{7,14}$ | $p_{7,23}$ | $p_{7,41}$ | $p_{7,49}$ | 0 |
| $p_{82}$ | $p_{85}$ | $p_{8,14}$ | $p_{8,23}$ | $p_{8,41}$ | $p_{8,49}$ | 1 |

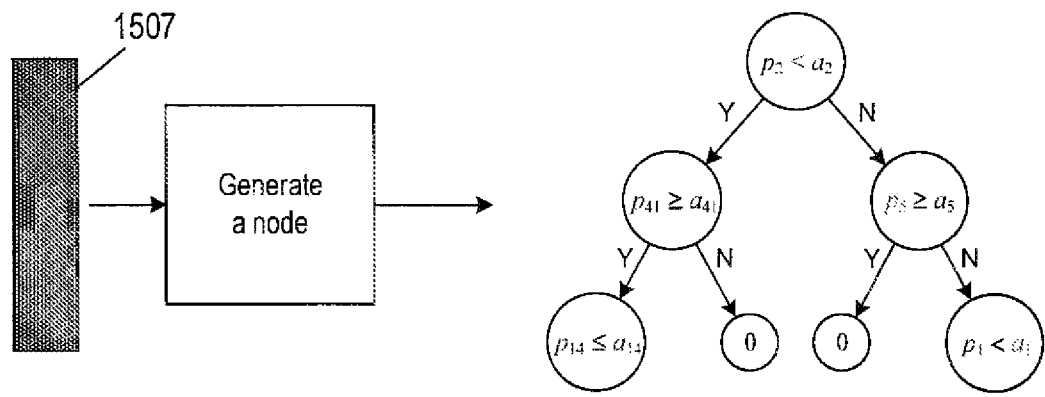
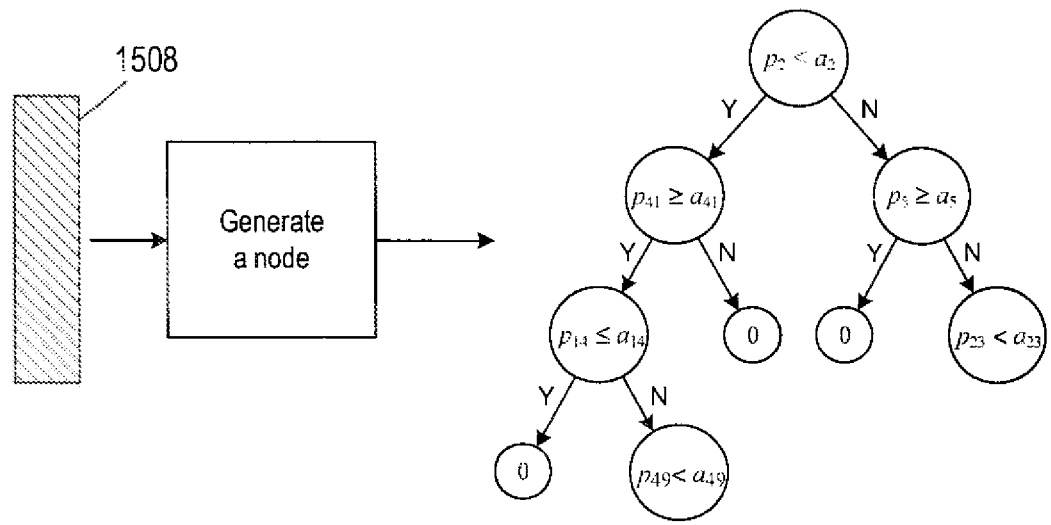
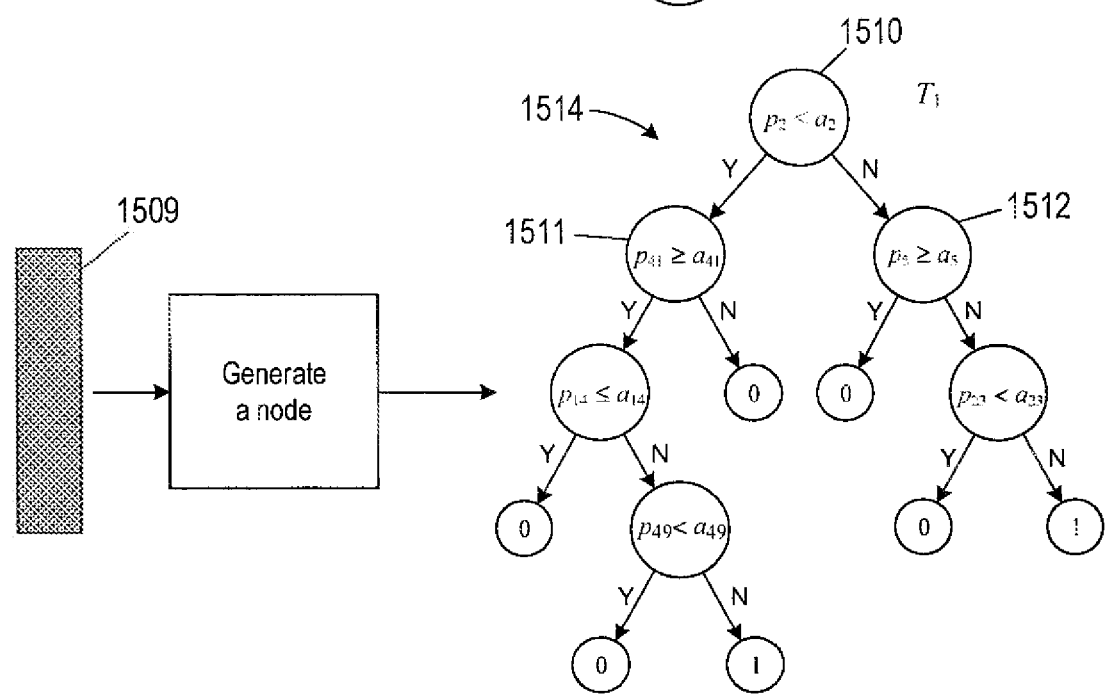
FIG. 15B $$True\_positive\_rate = \frac{True\_positive}{True\_positive + False\_negative}$$ — 2002

$$False\_positive\_rate = \frac{False\_positive}{False\_positive + True\_negative}$$ — 2004

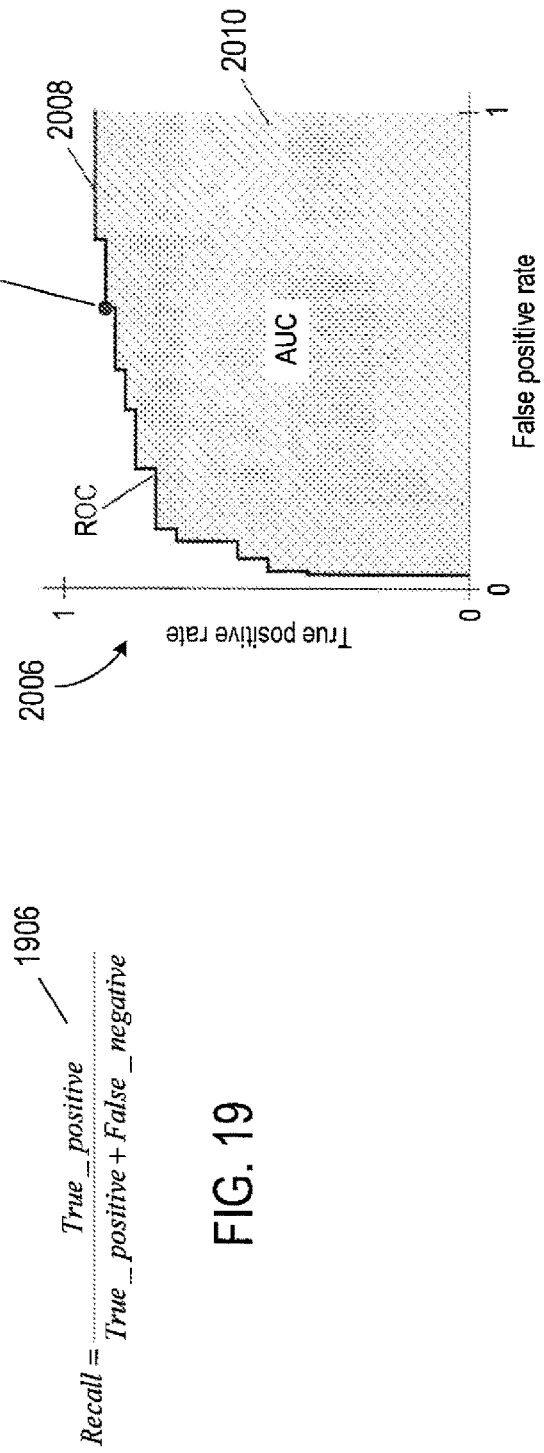

FIG. 20

$$F1\_score = \frac{2 \cdot Precision \cdot Recall}{Precision + Recall}$$ — 1902

$$Precision = \frac{True\_positive}{True\_positive + False\_positive}$$ — 1904

$$Recall = \frac{True\_positive}{True\_positive + False\_negative}$$ — 1906

FIG. 19

| Select | Event type | Log messages |
|---|---|---|
| ● Remove | $et_{19}$ | <99>2022-01-31T10:10:24.094Z li-qe-esx5.vmware.com Rhttpproxy: [FFFC2B90 verbose 'Proxy Req 46691'] new proxy client TCP (local=127.0.0.1:80, peer=127.0.0.1:50155) |
| ○ Remove | $et_{14}$ | <99>2022-01-31T10:12:24.093Z li-qe-esx5.vmware.com Rhttpproxy: [2889B90 verbose 'Proxy Req 46685'] The client closed the stream unexpectedly. |
| ○ Remove | $et_{50}$ | <99>2022-01-31T10:13:03.1926 esxi-skys-cu3-03.eng.vmware.com Urgent: 3 [71234146] ESXi host suddenly failed |
| ○ Remove | $et_{42}$ | <99>2022-01-31T10:11:51.396Z strata-esxl.eng.vmware.com Vpxa: [65B5AB90 verbose 'VpxaHalCnxHostagent' opID=WFU-ed393333] ESXi host non-responsive when running on vSAN cluster command |
| ● Remove | $et_7$ | Jan 31, 2022 11:19:42 strata-vc 2019-12-02T18:48:30.273Z [7FA39448B700 info 'commonvpxLro' opID=1947d6f9] [VpxLRO] -- FINISH task-internal-2163522 -- -- vim.SessionManager.logout -- |
| ● Remove | $et_{48}$ | 2022-01-31T11:11:48.744Z us22-0-esx7.oc.vmware.com Vpxa: info vpxa[931AB70] [Originator@6876 sub=vpxLro opID=717f4b8c-b6] [VpxLRO] - BEGIN lro-12347851 - vpxa vpxapi.VpxaService.queryBatchPerformanceStatistics - 521614b2-4bdb-2ca7-7f7d-b357de2cadbd |

Retrain random forest model

FIG. 23

METHODS AND SYSTEMS FOR USING MACHINE LEARNING TO RESOLVE PERFORMANCE PROBLEMS WITH OBJECTS OF A DATA CENTER

CROSS-REFERENCE TO RELATED APPLICATION

This application is a continuation-in-part to application Ser. No. 17/871,080, filed Jul. 22, 2022.

TECHNICAL FIELD

This disclosure is directed to resolving performance problems with objects executing in a data center, and in particular, to using machine learning to identify and resolve root causes of performance problems.

BACKGROUND

Electronic computing has evolved from primitive, vacuum-tube-based computer systems, initially developed during the 1940s, to modern electronic computing systems in which large numbers of multi-processor computer systems, such as server computers and workstations, are networked together with large-capacity data-storage devices to produce geographically distributed computing systems that provide enormous computational bandwidths and data-storage capacities. These large, distributed computing systems include data centers and are made possible by advancements in virtualization, computer networking, distributed operating systems and applications, data-storage appliances, computer hardware, and software technologies. The number and size of data centers has grown in recent years to meet the increasing demand for information technology ("IT") services, such as running applications for organizations that provide business services, web services, online retail services, streaming services, and other cloud services to millions of users each day.

Advancements in virtualization and software technologies provide many advantages for development and execution of distributed applications of businesses, governments, and other organizations as tenants in data centers. A distributed application comprises multiple software components called "microservices" that are executed in virtual machines ("VMs") or in containers on multiple server computers of a data center. The microservices communicate and coordinate data processing and data stores to appear as a single coherent application that provides services to end users. Data centers run tens of thousands of distributed applications with microservices that can be scaled up or down to meet customer and client demands. For example, VMs that run microservices can be created to satisfy increasing demand for the microservices or deleted when demand for the microservices decreases, which frees up computing resources. VMs and containers can also be migrated to different host server computers within a data center to optimize use of resources.

Data center management tools have been developed to monitor the performance of applications executing in a data center. Management tools collect metrics, such as CPU usage, memory usage, disk space available, and network throughput of applications. Data center tenants and system administrators rely on key performance indicators ("KPIs") to monitor the overall health and performance of applications executing in a data center. A KPI can be constructed from one or more metrics. KPIs that do not depend on metrics can also be used to monitor performance of applications. For example, a KPI for an online shopping application could be the number of shopping carts successfully closed per unit time. A KPI a website may be response times to user requests. Other KPIs can be used to monitor performance of various services provided by different microservices of a distributed application. Consider, for example, a distributed application that provides banking services via a bank website or a mobile application ("mobile app"). One microservice provides front-end services that enable users to input banking requests and receive responses to requests via the website or the mobile app. Other microservices of the distributed application provide back-end services that are executed in VMs or containers running on hosts of the data center. These services include processing user banking requests, maintaining data storage, and retrieving user information from data storage. Each of these microservices can be monitored with an error rate KPI and a time span KPI.

Although KPIs are useful for monitoring the health and performance of applications. KPIs are typically not helpful in revealing the root causes of health issues or performance problems. For example, a sudden increase in a response time KPI is useful in revealing a problem that users are experiencing, but the KPI does not reveal the root cause of the increase in response times. The increase may be due to any number of issues. For example, the microservices may be running in separate VMs that are contending for CPU time or for available memory of a host. A central microservice of the application may have stopped responding to requests from other microservices because the host the runs the central microservice is experiencing performance issues.

Because typical management tools cannot identify the root cause of most problems occurring in a data center, the search for root causes of performance problems is typically performed by teams of software engineers. Each team searches for a root cause of a problem by manually searching for issues in metrics and log messages. However, the troubleshooting process can take days and weeks, and in some cases longer. Data center tenants cannot afford such long periods of time spent sifting through various metrics, log messages, and lines of code for a root cause of a problem. Employing teams of engineers to spend days and weeks to search for a problem is expensive and error prone. Problems with a data center tenant's applications result in downtime and continue to the slow performance of their applications, which frustrates users, damages a brand name, causes lost revenue, and in many cases can deny people access to vital services provided by data center tenants. Systems administrators and data center tenants seek automated methods and systems that identify root causes of run-time problems and significantly reduce or eliminate entirely reliance on teams of engineers to identify the root causes of performance issues.

SUMMARY

This disclosure is directed to automated, computer-implemented methods and systems for resolving performance problems with objects executing in a data center. The automated methods are executed by an operations manager that runs in a host of the data center. The operations manager collects log messages from event sources associated with a data center object. Each log message is an unstructured or semi-structured time-stamped message that records an event that occurred during execution of the object, execution of an operating system, execution of a service provided by the object, or an issue occurring with the object. The log messages are stored in log files. The automated methods use machine learning to obtain rules defining relationships between probabilities of event types of in log messages and performance problems identified by a key performance indictor ("KPI") of the object. The operations manager monitors the KPI during run-time of the object. In response to detecting a run-time KPI violation of a KPI threshold, probabilities of event types of log messages recorded in a run-time interval are determined. The operations manager uses the rules to evaluate the event-type probabilities for important event types. Log messages with the important event types and generated in the run-time interval are identified. An alert identifying the KPI threshold violation, and the log messages are displayed in a graphical user interface of an electronic display device. The log messages describe the probable root cause of the performance problem, which enables identification of diagnosis of the performance problem with the object. The operations manager executes remedial measures that resolve the performance problem.

DESCRIPTION OF THE DRAWINGS

FIG. 6 shows an example of a log write instruction.

FIG. 7 shows an example of a log message generated by the log write instruction in FIG. 6.

FIG. 9A shown a table of examples of regular expressions designed to match particular character strings of log messages.

FIG. 9B shows a table of examples primary Grok patterns and corresponding regular expressions.

FIG. 9C shows an example of a Grok expression used to extract tokens from a log message.

FIG. 10A shows an example plot of a key performance indicator ("KPI") associated with an object of a data center.

FIG. 10B shows a plot of the KPI values in FIG. 10A with a threshold that separates outlier KPI values from normal KPI values.

FIG. 14B shows an example of event-type probabilities of seven randomly selected event types and corresponding class labels.

FIGS. 15A-15B show an example of constructing a random forest tree from event-type probabilities of different randomly sets of event types.

FIG. 19 shows the formula for the F1-score as a function of precision and recall.

FIG. 20 shows an example of computing the ROC and AIX in ROC AUC.

FIG. 23 shows an example graphical user interface that displays the important event types and corresponding most recently generated log messages.

DETAILED DESCRIPTION

This disclosure presents automated methods and systems for resolving performance problems with applications executing in a data center object. Log messages, event types, and key performance indicators are described in a first subsection. Automated methods and systems for resolving performance problems with applications executing in a data center are described in a second subsection.

Log Messages, Event Types, and Key Performance Indicators

Figure 1:
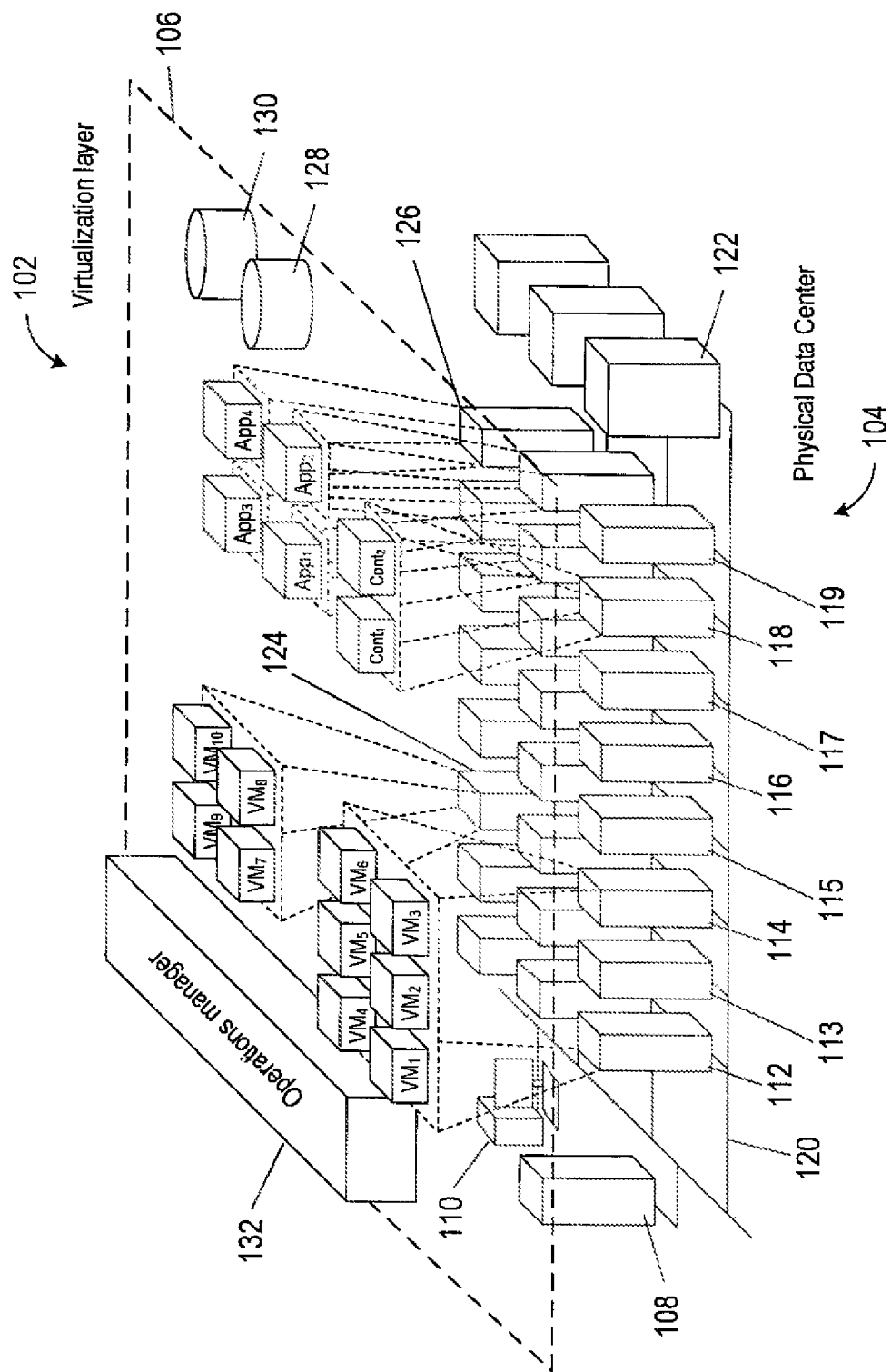
FIG. 1 shows an example of a virtualization layer located above a physical data center.

FIG. 1 shows an example of a virtualization layer 102 located above a physical data center 104. For the sake of illustration, the virtualization layer 102 is separated from the physical data center 104 by a virtual-interface plane 106. The physical data center 104 is an example of a distributed computing system. The physical data center 104 comprises physical objects, including an administration computer system 108, any of various computers, such as PC 110, on which an operations management interface may be displayed in a graphical user interface to system administrators and other users, server computers, such as server computers 112-119, data-storage devices, and network devices. The server computers may be networked together to form server-computer groups within the data center 104. The example physical data center 104 includes three server-computer groups each of which have eight server computers. For example, server-computer group 120 comprises interconnected server computers 112-119 that are connected to a mass-storage array 122. Within each server-computer group, certain server computers are grouped together to form a cluster that provides an aggregate set of resources (i.e., resource pool) to objects in the virtualization layer 102. Different physical data centers may include many different types of computers, networks, data-storage systems, and devices connected according to many different types of connection topologies.

The virtualization layer 102 includes virtual objects, such as virtual machines ("VMs"), applications, and containers, hosted by the server computers in the physical data center 104. A VM is a compute resource that uses software instead of a physical computer to run programs and deploy applications. One or more VMs run on a physical "host" server computer. Each VM runs its own operating system called a "guest operating system" and functions separately from the other VMs, even though the VMs may all be running on the same host. A container contains a single program or application along with dependencies and libraries and containers share the same operating system. Multiple containers can be run in pods on the same server computers. The virtualization layer 102 may also include a virtual network (not illustrated) of virtual switches, routers, load balancers formed from the physical switches, routers, and NICs of the physical data center 104. Certain server computers host VMs while other host containers. For example, server computer 118 hosts two containers identified as $Cont_1$ and $Cont_2$; cluster of server computers 112-114 host six VMs identified as $VM_1$, $VM_2$, $VM_3$, $VM_4$, $VM_5$, and $VM_6$; server computer 124 hosts four VMs identified as $VM_7$, $VM_8$, $VM_9$, $VM_{10}$. Other server computers may host applications. For example, server computer 126 hosts applications identified as $App_1$, $App_2$, $App_3$, and $App_4$. The virtual-interface plane 106 abstracts the resources of the physical data center 104 to one or more VDCs comprising the virtual objects and one or more virtual data stores, such as virtual data stores 128 and 130. For example, one VDC may comprise $VM_7$, $VM_8$, $VM_9$, and $VM_{10}$ running on server computer 124 and virtual data store 128.

Automated methods described below are performed by an operations manager 132 that is executed in one or more VMs or containers on the administration computer system 108. The operations manager 132 is an automated computer implemented tool that aids IT administrators with monitoring, troubleshooting, and managing the health and capacity of the data center virtual environment. The operations manager 132 provides management across physical, virtual, and cloud environments. The operations manager 132 receives object information, which includes streams of metric data and log messages from various physical and virtual objects of the data center described below.

Figure 2A:
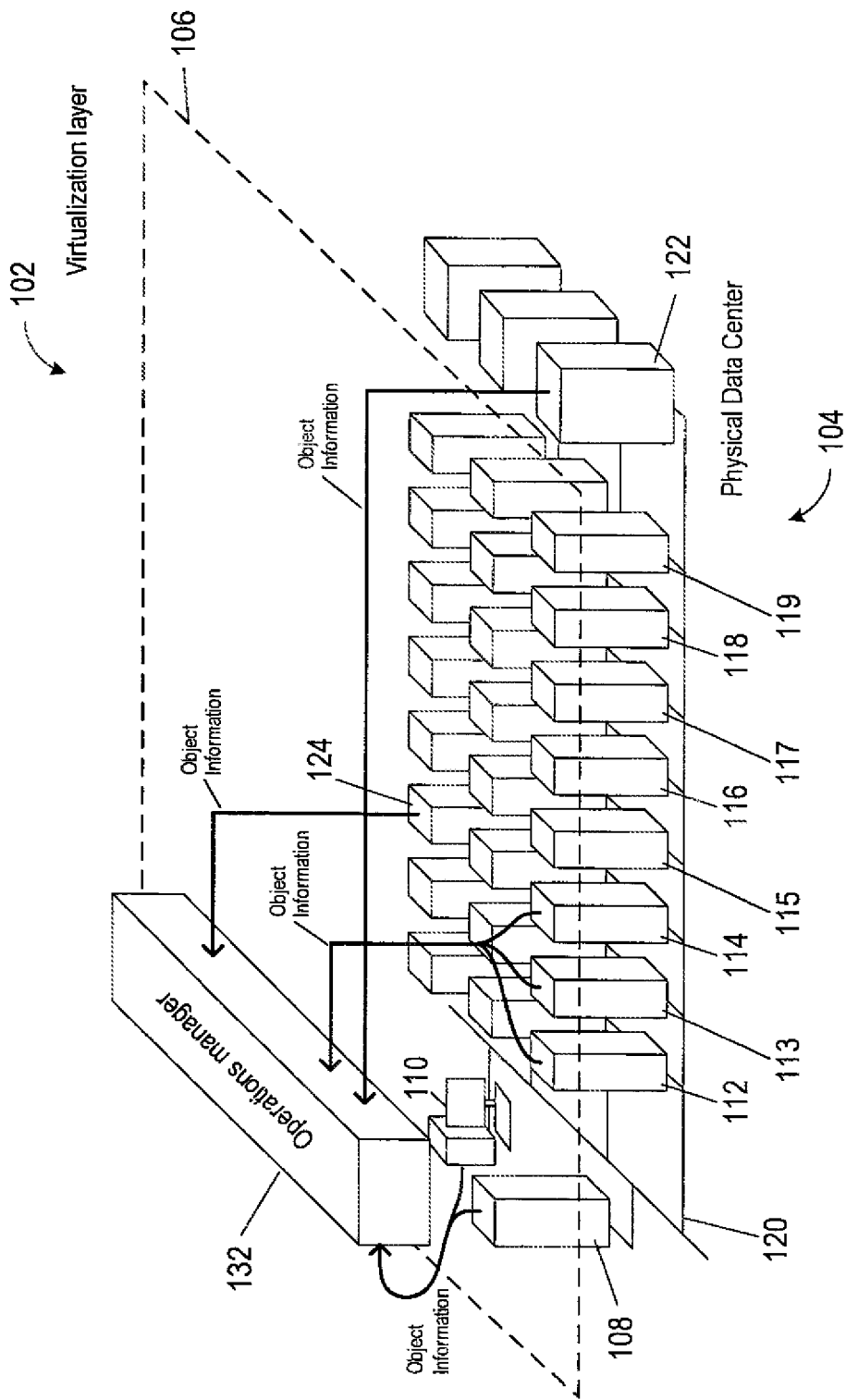
FIGS. 2A-2B shows an operations manager that receives object information from various physical and virtual objects.
Figure 2B:
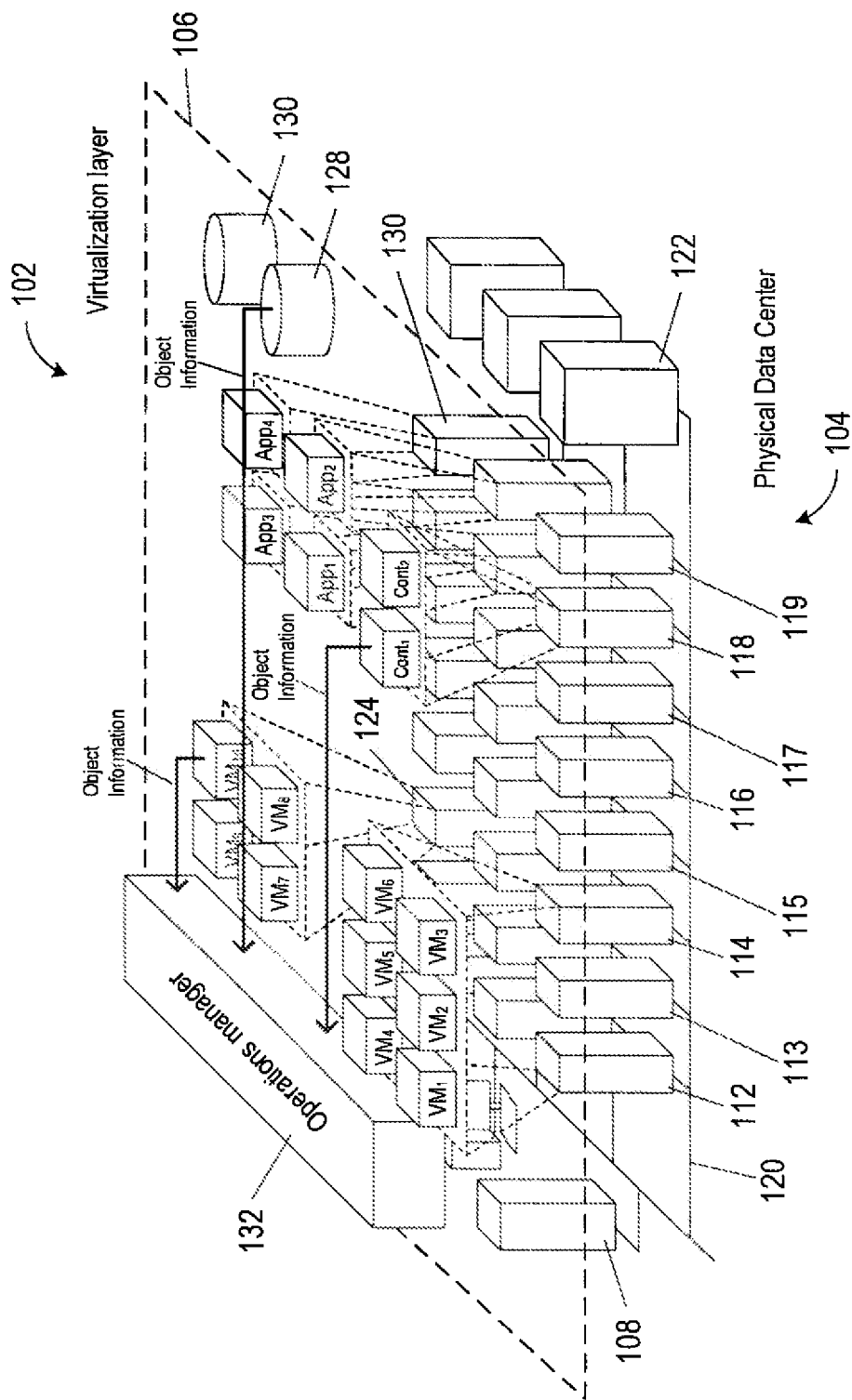

FIGS. 2A-2B show examples of the operations manager 132 receiving object information from various physical and virtual objects. Directional arrows represent object information sent from physical and virtual resources to the management server 132. In FIG. 2A, the operating systems of PC 110, server computers 108 and 124, and mass-storage array 122 send object information to the operations manager 132. A cluster of server computers 112-114 send object information to the operations manager 132. In FIG. 2B, the VMs, containers, applications, and virtual storage independently send object information to the operations manager 132. Certain objects may send metrics as the object information is generated while other objects may only send object information at certain times or when requested to send object information by the operations manager 132. The operations manager 132 collects and processes the object information as described below to detect performance problems and generate recommendations to correct the performance problems and executes user-selected remedial to correct problem. Depending on the type of the performance problem, recommendations include reconfiguring a virtual network of a VDC or migrating VMs from one server computer to another, powering down server computers, replacing VMs disabled by physical hardware problems and failures, spinning up cloned VMs on additional server computers to ensure that services provided by the VMs are accessible to increasing demand or when one of the VMs becomes compute or data-access bound.

Figure 3:
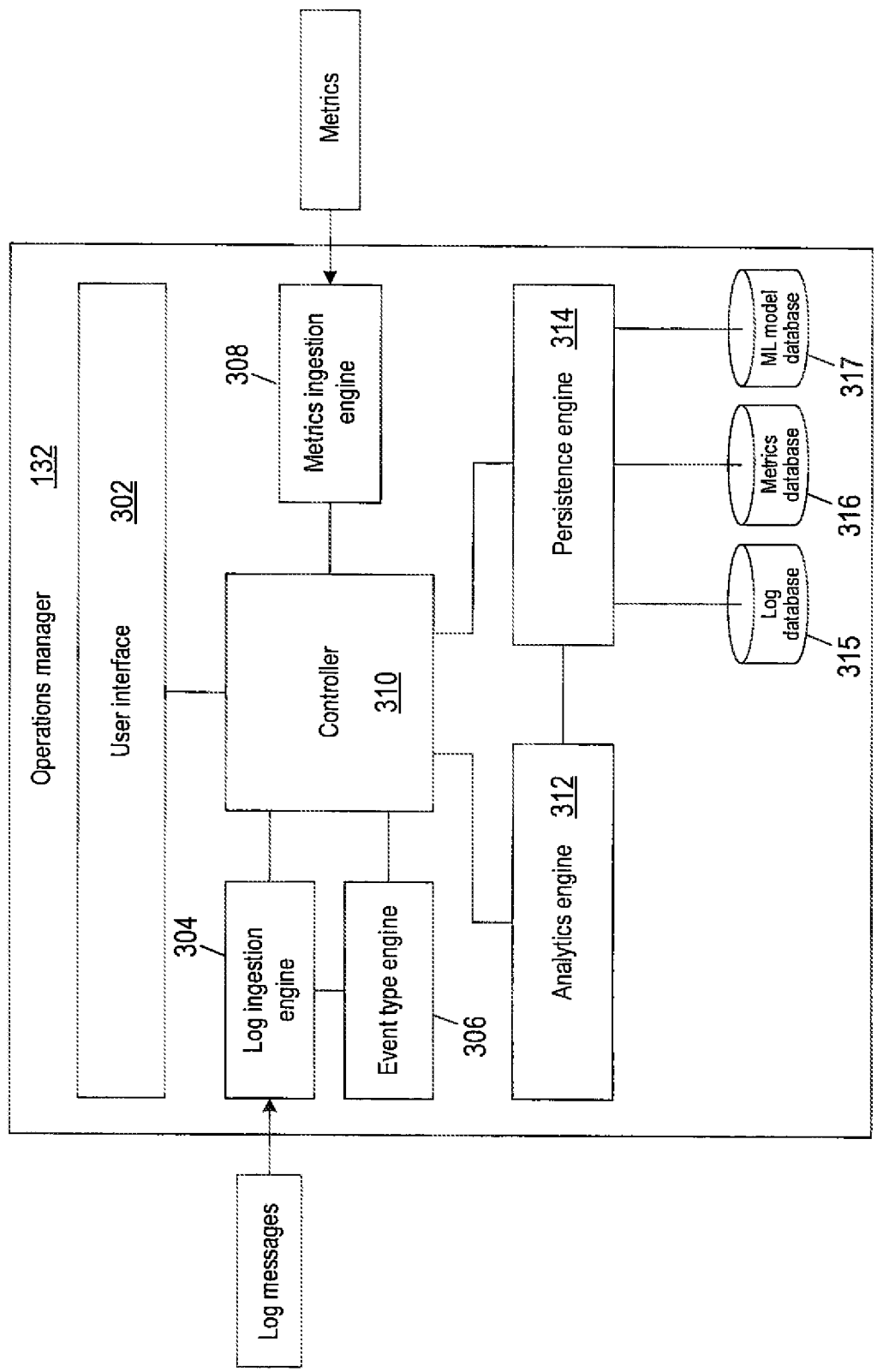
FIG. 3 shows an example architecture of an operations manager.

FIG. 3 shows an example architecture of the operations manager 132. This example architecture includes a user interface 302 that provides graphical user interfaces for data center management, system administrators, and application owners to receive alerts, view metrics, log messages, and KPIs, and execute user-selected remedial measures to correct performance problems. The operations manager 132 includes a log ingestion engine 304 that receives log messages sent from log monitoring agents deployed at sources of log messages described below with reference to FIGS. 4-8, and an event type engine 306 that extracts event types from the log messages, as described below with reference to FIGS. 9A-9C. The operations manager 132 includes a metrics ingestion engine 308 that receives metrics from agents deployed at sources of metric data. The operations manager 132 includes a controller 310 that manages and directs the flow of object information collected by the engines 304 and 308. The controller 310 manages the user interface 302 and directs the flow of instructions received via the user interface 302 and the flow of information displayed on the user interface 302. The controller 310 directs the flow of object information to the analytics engine 312. The analytics engine 312 performs system health assessments b monitoring key performance indicators ("KPIs") for problems with applications or other data center objects, maintains dynamic thresholds of metrics, and generates alerts in response to KPIs that violate corresponding thresholds. The analytics engine 312 uses machine learning ("ML") as described below to generate models that are used to generate rules for interpreting degradation of a KPI or indicate the most influential dimensions features for a long-term explanation of those degradations. The persistence engine 314 stores metrics, log messages, and the models in corresponding data bases 315-317.

Log Messages

Figure 4:
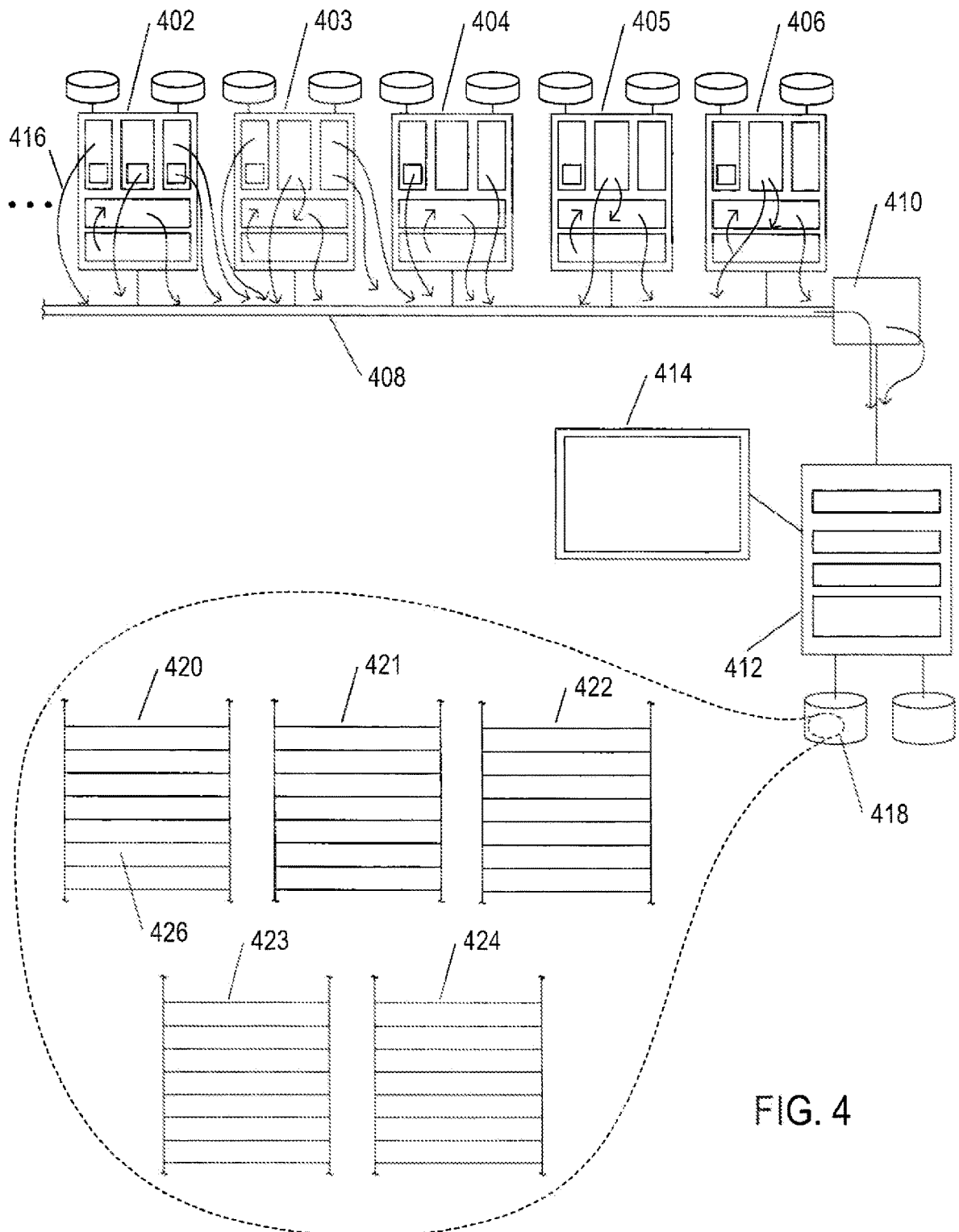
FIG. 4 shows an example of logging log messages in log files.

FIG. 4 shows an example of logging log messages in log files. In FIG. 4, computer systems 402-406 within a data center are linked together by an electronic communications medium 408 and additionally linked through a communications bridge/router 410 to an administration computer system 412 that includes an administrative console 414. Each of the computer systems 402-406 may run a log monitoring agent that forwards log messages to the operations manager 132 executing on the administration computer system 412. As indicated by curved arrows, such as curved arrow 416, multiple components within each of the computer systems 402-406 as well as the communications bridge/router 410 generate log messages that are forwarded to the administration computer system 412. Each log message records an event and is generated by any event source. Event sources may be, but are not limited to, programs, operating systems, VMs, guest operating systems, containers, network devices, machine codes, event channels, and other computer programs or processes running on the computer systems 402-406, the bridge/router 410 and any other components of a data center. Log messages are received by log monitoring agents at various hierarchical levels within a computer system and then forwarded to the administration computer system 412. The operations manager 132 records the log messages in log files 420-424 of the log database 315 of a data-storage device or appliance 418. Rectangles, such as rectangle 426, represent individual log messages. For example, log file 420 may contain a list of log messages generated within the computer system 402. Each log monitoring agent has a configuration that includes a log path and a log parser. The log path specifies a unique file system path in terms of a directory tree hierarchy that identifies the storage location of a log file on the data-storage device 418. The log monitoring agent receives specific file and event channel log paths to monitor log files and the log parser includes log parsing rules to extract and format lines of the log message into log message fields described below.

Figure 5:
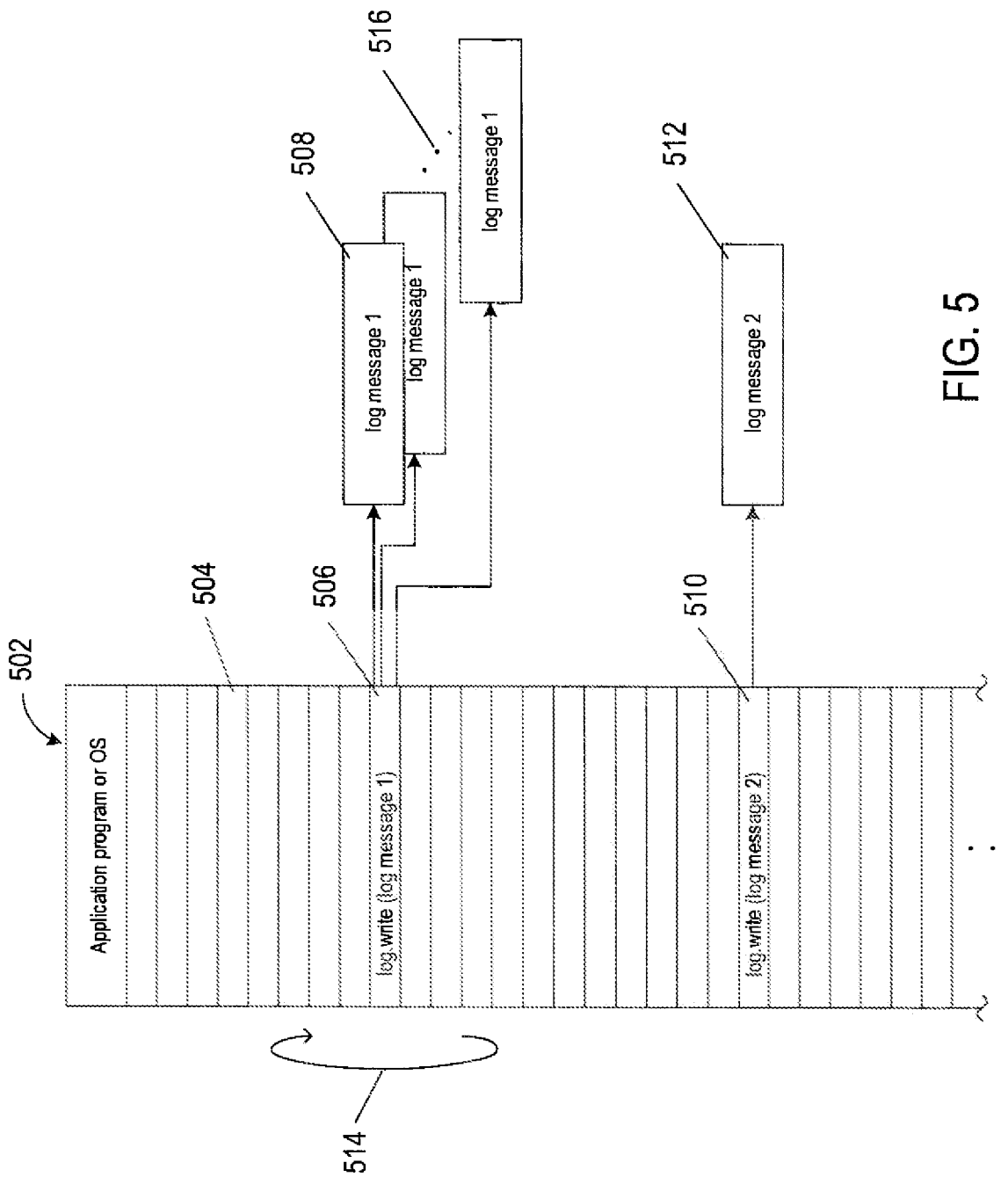
FIG. 5 shows an example source code of an event source.

FIG. 5 shows an example source code 502 of an event source. The event source can be an application, an operating system, a VM, a guest operating system, or any other computer program or machine code that generates log messages. The source code 502 is just one example of an event source that generates log messages. Rectangles, such as rectangle 504, represent a definition, a comment, a statement, or a computer instruction that expresses some action to be executed by a computer. The source code 502 includes log write instructions that generate log messages when certain events predetermined by a developer occur during execution of the source code 502. For example, source code 502 includes an example log write instruction 506 that when executed generates a "log message 1" represented by rectangle 508, and a second example log write instruction 510 that when executed generates "log message 2" represented by rectangle 512. In the example of FIG. 5, the log write instruction 508 is embedded within a set of computer instructions that are repeatedly executed in a loop 514. As shown in FIG. 5, the same log message 1 is repeatedly generated 516. The same type of log write instructions may also be located in different places throughout the source code, which in turns creates repeats of essentially the same type of log message in the log file.

In FIG. 5, the notation "log.write( )" is a general representation of a log write instruction. In practice, the form of the log write instruction varies for different programming languages. In general, the log write instructions are determined by the developer and are unstructured, or semi-structured, and in many cases are relatively cryptic. For example, log write instructions may include instructions for time stamping the log message and contain a message comprising natural-language words and/or phrases as well as various types of text strings that represent file names, path names, and perhaps various alphanumeric parameters that may identify objects, such as VMs, containers, or virtual network interfaces. In practice, a log write instruction may also include the name of the source of the log message (e.g., name of the application program, operating system and version, server computer, and network device) and may include the name of the log file to which the log message is recorded. Log write instructions are written in a source code by the developer of a program or operating system in order to record events that occur while an operating system or application program is executing. For example, a developer may include log write instructions that record informative events including, but are not limited to, identifying startups, shutdowns, I/O operations of applications or devices; errors identifying runtime deviations from normal behavior or unexpected conditions of applications or non-responsive devices; fatal events identifying severe conditions that cause premature termination; and warnings that indicate undesirable or unexpected behaviors that do not rise to the level of errors or fatal events. Problem-related log messages (i.e., log messages indicative of a problem) can be warning log messages, error log messages, and fatal log messages. Informative log messages are indicative of a normal or benign state of an event source.

FIG. 6 shows an example of a log write instruction 602. The log write instruction 602 includes arguments identified with "$" that are filled at the time the log message is created. For example, the log write instruction 602 includes a time-stamp argument 604, a thread number argument 606, and an internet protocol ("IP") address argument 608. The example log write instruction 602 also includes text strings and natural-language words and phrases that identify the level of importance of the log message 610 and type of event that triggered the log write instruction, such as "Repair session" argument 612. The text strings between brackets "[ ]" represent file-system paths, such as path 614. When the log write instruction 602 is executed by a log management agent, parameters are assigned to the arguments and the text strings and natural-language words and phrases are stored as a log message of a log file.

FIG. 7 shows an example of a log message 702 generated by the log write instruction 602. The arguments of the log write instruction 602 may be assigned numerical parameters that are recorded in the log message 702 at the time the log message is executed by the log management agent. For example, the time stamp 604, thread 606, and IP address 608 arguments of the log write instruction 602 are assigned corresponding numerical parameters 704, 706, and 708 in the log message 702. Alphanumeric expression 1910 is assigned to a repair session argument 612. The time stamp 704 represents the date and time the log message 702 was generated. The text strings and natural-language words and phrases of the log write instruction 602 also appear unchanged in the log message 702 and may be used to identify the type of event (e.g., informative, warning, error, or fatal), also called an "event type," that occurred during execution of the event source.

Figure 8:
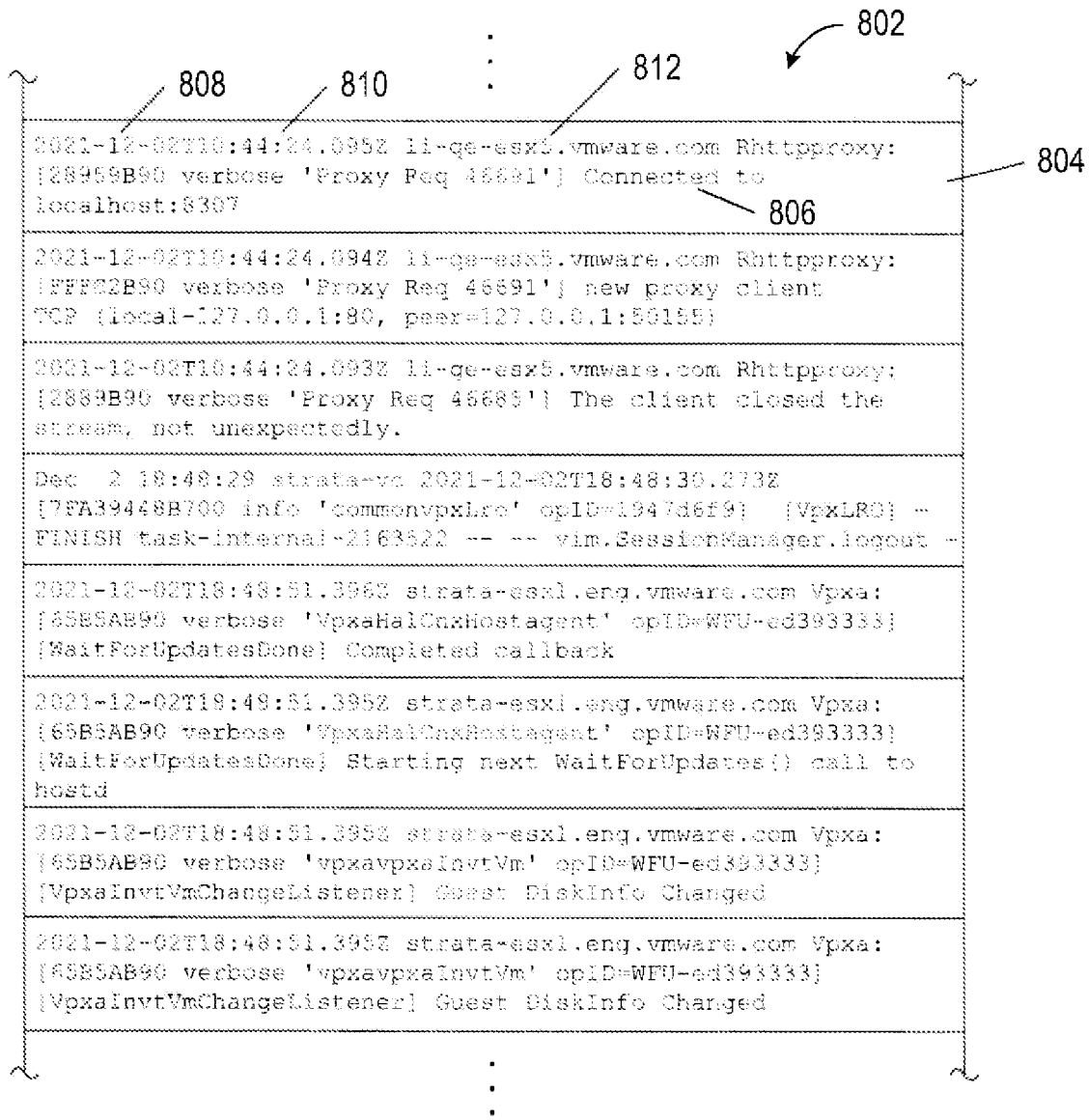
FIG. 8 shows a small, eight-entry portion of a log file.

As log messages are received from various event sources, the log messages are stored in corresponding log files of the log database 314 in the order in which the log messages are received. FIG. 8 shows a small, eight-entry portion of a log file 802. In FIG. 8, each rectangular cell, such as rectangular cell 804, of the log file 802 represents a single stored log message. For example, log message 804 includes a short natural-language phrase 806, date 808 and time 810 numerical parameters, and an alphanumeric parameter 812 that identifies a particular host computer.

Key Performance Indicators

The analytics engine 312 constructs certain key performance indicators ("KPIs") of application performance and stores the KPIs in the KPI database 316. An application can have numerous associated KPIs. Each KPI of an application measures a different feature of application performance and is used by the analytics engine 312 to detect a particular performance problem. A KPI is a metric that can be constructed from other metrics and is used as an indicator of the health of an application executing in the data center. A KPI is denoted by $$(y_m)_{m=1}^{M} = (y(t_m))_{m=1}^{M} \quad (1)$$

where
- $t_m$ is a time stamp;
- $y_m = y(t_m)$ is a metric value; and
- M is the number of KPI values recorded over a time period.

A distributed resource scheduling ("DRS") score is an example of a KPI that is constructed from other metrics and is used to measure the performance level of a VM, container, or components of a distributed application. The DRS score is a measure efficient use of resources (e.g., CPU, memory, and network) by an object and is computed as a product of efficiencies as follows:

$$y(t_m) = EFFCY_{CPU}(t_m) \times EFFCY_{Mem}(t_m) \times EFFCY_{Net}(t_m)$$

where $$EFFCY_{CPU}(t_m) = \frac{CPU\ usage\ (t_m)}{Ideal\ CPU\ usage};$$

$$EFFCY_{Mem}(t_m) = \frac{Memory\ usage\ (t_m)}{Ideal\ Memory\ usage}; and$$

$$EFFCY_{Net}(t_m) = \frac{Network\ throughput\ (t_m)}{Ideal\ Network\ throughput}$$

The metrics CPU usage ($t_m$). Memory usage ($t_m$), and Network throughput ($t_m$) of an object are measured at points in time as described above with reference to Equation (2). Ideal CPU usage, Ideal Memory usage, and Ideal Network throughput are preset. For example, Ideal CPU usage may be preset to 30% of the CPU and Ideal Memory usage may be preset to 40% of the memory. DRS scores can be used for, example, as a KPI that measures the overall health of a distributed application by aggregating, or averaging, the DRS scores of each VM that executes a component of the distributed application.

Other examples of KPIs for an application include average response times to client request, error rates, contention time for resources, or a peak response time. Other types of KPIs can be used to measure the performance level of a cloud application. A cloud application is a distributed application with data storage and logical components of the application executed in a data center and local components provide access to the application over the internet via a web browser or a mobile application on a mobile device. For example, a KPI for an online shopping application could be the number of shopping carts successfully closed per unit time. A KPI for a website may be response times to customer requests. KPIs may also include latency in data transfer, throughput, number of packets dropped per unit time, or number of packets transmitted per unit time.

The analytics engine 312 detects performance problems by comparing a values of a KPI to a corresponding KPI threshold, denoted by $Th_{KPI}$. The corresponding KPI threshold $Th_{KPI}$ can be a dynamic threshold that is automatically adjusted by the analytics engine 312 to changes in the application behavior over time or the threshold can be a fix threshold. When one or more metric values of the KPI violate the threshold, such as $y_i > Th_{KPI}$ for an upper threshold, or $y_i < Th_{KPI}$ for a lower threshold, the application is exhibiting a performance problem, the analytics engine 312 generates an alert that is displayed in the user interface 302.

Event Types

The event type engine 306 extracts parametric and non-parametric strings of characters called tokens from log messages using regular expressions. A regular expression, also called "regex," is a sequence of symbols that defines a search pattern in text data. Many regex symbols match letters and numbers. For example, the regex symbol "a" matches the letter "a," but not the letter "b," and the regex symbol "100" matches the number "100," but not the number 101. The regex symbol "." matches any character. For example, the regex symbol ".art" matches the words "dart," "cart," and "tart," but does not match the words "art," "hurt," and "dark." A regex followed by an asterisk "*" matches zero or more occurrences of the regex. A regex followed by a plus sign "+" matches one or more occurrences of a one-character regex. A regular expression followed by a questions mark "?" matches zero or one occurrence of a one-character regex. For example, the regex "a*b" matches b, ab, and aaab but does not match "baa." The regex "a+b" matches ab and aaab but does not match b or baa. Other regex symbols include a "\d" that matches a digit in 0123456789, a "\s" matches a white space, and a "\b" matches a word boundary. A string of characters enclosed by square brackets, [ ], matches any one character in that string. A minus sign "–" within square brackets indicates a range of consecutive ASCII characters. For example, the regex [aeiou] matches any vowel, the regex [a-f] matches a letter in the letters abcdef, the regex [0-9] matches a 0123456789, the regex [. _ %+–] matches any one of the characters . _ %+–. The regex [0-9a-f] matches a number in 0123456789 and a single letter in abcdef. For example, [0-9a-f] matches a6, i5, and u2 but does not match ex, 9v, or %6. Regular expressions separated a vertical bar "|" represent an alternative to match the regex on either side of the bar. For example, the regular expression Get|GetValue|Set|Setvalue matches any one of the words: Get, GetValue, Set, or SetValue. The braces "{ }" following square brackets may be used to match more than one character enclosed by the square brackets. For example, the regex [0-9]{2} matches two-digit numbers, such as 14 and 73 but not 043 and 4, and the regex [0-9]{1-2} matches any number between 0 and 99, such as 3 and 58 but not 349.

Simple regular expressions are combined to form larger regular expressions that match character strings of log messages and can be used to extract the character strings from the log messages. FIG. 9A shown a table of examples of regular expressions designed to match particular character strings of log messages. Column 902 list six different types of strings that may be found in log messages. Column 904 list six regular expressions that match the character strings listed in column 902. For example, an entry 906 of column 902 represents a format for a date used in the time stamp of many types of log messages. The date is represented with a four-digit year 908, a two-digit month 909, and a two-digit day 910 separated by slashes. The regex 912 includes regular expressions 914-916 separated by slashes. The regular expressions 914-916 match the characters used to represent the year 908, month 909, and day 910. Entry 918 of column 902 represents a general format for internet protocol ("IP") addresses. A typical general IP address comprises four numbers. Each number ranges from 0 to 999 and each pair of numbers is separated by a period, such as 27.0.15.123. Regex 920 in column 904 matches a general IP address. The regex [0-9]{1-3} matches a number between 0 and 999. The backslash "\" before each period indicates the period is part of the IP address and is different from the regex symbol "." used to represent any character. Regex 922 matches any IPv4 address. Regex 924 matches any base-10 number. Regex 926 matches one or more occurrences of a lower-case letter, an upper-case letter, a number between 0 and 9, a period, an underscore, and a hyphen in a character string. Regex 928 matches email addresses. Regex 928 includes the regex 926 after the ampersand symbol.

In another implementation, the event-type engine 306 extracts non-parametric tokens from log messages using Grok expressions that are constructed from Grok patterns. Grok patterns are predefined symbolic representations of regular expressions that reduce the complexity of constructing regular expressions. Grok patterns are categorized as either primary Grok patterns or composite Grok patterns that are formed from primary Grok patterns. A Grok pattern is called and executed using the notation Grok syntax %{Grok pattern}.

FIG. 9B shows a table of examples of primary Grok patterns and corresponding regular expressions. Column 932 contains a list of primary Grok patterns. Column 934 contains a list of regular expressions represented by the Grok patterns in column 932. For example, the Grok pattern "USERNAME" 936 represents the regex 938 that matches one or more occurrences of a lower-case letter, an upper-case letter, a number between 0 and 9, a period, an underscore, and a hyphen in a character string. Grok pattern "HOSTNAME" 940 represents the regex 942 that matches a hostname. A hostname comprises a sequence of labels that are concatenated with periods. Note that the list of primary Grok patterns shown in FIG. 9 is not an exhaustive list of primary Grok patterns.

Grok patterns may be used to map specific character strings into dedicated variable identifiers. Grok syntax for using a Grok pattern to map a character string to a variable identifier is given by:

%{GROK_PATTERN:variable_name} where

GROK_PATTERN represents a primary or a composite Grok pattern; and variable_name is a variable identifier assigned to a character string in text data that matches the GROK_PATTERN.

A Grok expression is a parsing expression that is constructed from Grok patterns that match characters strings in text data and may be used to parse character strings of a log message. Consider, for example, the following simple example segment of a log message:

34.5.243.1 GET index.html 14763 0.064

A Grok expression that may be used to parse the example segment is given by:

^%{IP:ip_address}\s%{WORD:word}\s%{URIPATHPARAM:request}\s%{INT:bytes}\s%{NUMBER:duration}$ The hat symbol identifies the beginning of a Grok expression. The dollar sign symbol "$" identifies the end of a Grok expression. The symbol "\s" matches spaces between character strings in the example segment. The Grok expression parses the example segment by assigning the character strings of the log message to the variable identifiers of the Grok expression as follows:

ip_address: 34.5.243.1
word: GET
request: index.html
bytes: 14763
duration: 0.064

Different types of regular expressions or Grok expressions are configured to match token patterns of log messages and extract tokens from the log messages. Numerous log messages may have different parametric tokens but the same set of non-parametric tokens. The non-parametric tokens extracted from a log message describe the type of event, or event type, recorded in the log message. The event type of a log message is denoted by $E_i$, where subscript i is an index that distinguishes the different event types of log messages. Many event types correspond to benign events recorded in log message while event types that describe errors, warning or critical problems are identified by the operation management server 132.

FIG. 9C shows an example of a Grok expression 944 used to extract tokens from a log message 946. Dashed directional arrows represent parsing the log message 946 such that tokens that correspond to Grok patterns of the Grok expression 944 are assigned to corresponding variable identifiers. For example, dashed directional arrow 948 represents assigning the time stamp 2021-07-18T06:32:07+00:00 950 to the variable identifier timestamp_iso8601 952 and dashed directional arrow 954 represents assigning HTTP response code 200 956 to the variable identifier response code 958. FIG. 9C shows assignments of tokens of the log message 946 to variable identifiers of the Grok expression 944. The combination of non-parametric tokens 960-962 identify the event type 964 of the log message 946. Parametric tokens 966-968 may change for different log messages with the same event type 964.

Automated Methods and System for Resolving
Performance Problems with Applications Executing
in a Data Center A KPI reveals performance problems of an application. One the other hand, log messages can provide contextual information about the performance problems discovered with the KPI. The analytics engine 312 uses machine learning as described below to train a model that contains specific rules relating events recorded in log messages to KPI values of the KPI recorded in a historical time period. The analytics engine 312 uses the rules to determine which events recorded in run-time log messages identify a probable root cause of a performance problem revealed by the KPI.

FIG. 10A shows an example plot of a KPI associated with an object executing in a data center. In the following discussion, the object can be an application, microservice of a distributed application, a VM, a container, computer hardware, such as a host or switch. The analytics engine 312 measures the KPI in monitoring intervals and stores the KPI values in the metrics database 316. Horizontal line 1002 represents a time axis of a historical time period. Vertical axis 1004 represents a range of KPI values. The time axis 1002 is partitioned into nine shorter time periods. Each shorter time period may represent one day, 12 hours, 8 hours, or 1 hour. Solid dots represent KPI values produced at the end of regularly spaced time intervals of the shorter time periods. Solid dots 1006 represents KPI value $y_m$, and solid dot 1008 represents KPI value $y_{m+1}$. For example, the time period 1010 may represents one day and the KPI is the response time of an application to customer requests. Alternatively, the KPI values, such as KPI values $y_m$ 1006 and $y_{m+1}$ 1008, may represent the average response time of the website measured in three-hour time intervals. KPI value $y_{m+1}$ 1008 indicates a spike, or significant increase, in response times to customer requests in the time interval 1012, which may be an indication of degradation of the object or a high traffic volume. The KPI indicates a performance problem, but the KPI does not reveal the cause of the behavior.

The analytics engine 312 determines which KPI values in the historical time period are outliers. An outlier KPI value is an indication of a performance problem (i.e., abnormal behavior) of an object. KPI values are labeled with tags that distinguishes outlier KPI values from normal KPI values. For example, in the follow discussion, the outlier KPI values are tagged with class label "1" and normal KPI values are tagged with class label "0."

A KPI threshold, $Th_{KPI}$, can be used to detect outlier KPI values. For example, a data center tenant may not want response times to customer requests to exceed 1 minute. In this example, the KPI threshold is set to 1 minute. Alternatively, the KPI threshold may be a percentile. For example, KPI values in the 99$^{th}$ percentile of the KPI values recorded over the historical time period, such as a week or two weeks, are outliers. In another implementation, the analytic engine 312 partitions the KPI values recorded over the period of time into quartiles, where $Q_2$ denotes the median of KPI values, $Q_1$ denotes a lower median of the KPI values that are less than the median $Q_2$, and $Q_3$ denotes an upper median of the KPI values that are greater than the median $Q_2$. Fifty percent of the KPI values lie in the interquartile range:

$$IQR = Q_3 - Q_1 \tag{3}$$

The analytics engine 312 computes a whisker minimum given by $$\text{Min} = Q_1 - B \times IQR \tag{4a}$$

and computers a whisker maximum given by $$\text{Max} = Q_3 + B \times IQR \tag{4b}$$

where B is a constant greater than 1 (e.g., B=1.5). The whisker minimum and whisker maximum are thresholds that are used to evaluate KPI values. KPI values that are less that the whisker minimum are outliers and KPI values that are greater that the whisker maximum are outliers. The analytics engine 312 applies a first KPI label to KPI values that are an indication of performance problem (i.e., outliers) and applies a second KPI label to KPI values that are not an indication of performance problem (i.e., normal).

FIG. 10B shows a plot of the KPI values in FIG. 10A with a threshold 1014 that separates outlier KPI values from normal KPI values. KPI values 1008, 1016, and 1018 are greater than the threshold 1014 and are tagged with a KPI label given by class label KPI values, such as values 1008, 1018, and 1020, that are less than the KPI threshold are tagged with a KPI label given by class label 0.

The analytics engine 312 computes a probability distribution of event types of log messages produced in the time intervals between consecutive KPI values. Let N be the total number of event types that can be extracted from log messages generated by event sources associated with the object. The event type engine 306 determines the event type of each log message produced in the m-th time interval that precedes the m-th KPI value. The analytics engine 312 computes the number of times each event type appeared in the time interval. Let $n(et_{mn})$ denote an event type counter of the number of times the event type $et_{mn}$ occurred in the time interval, where n=1, . . . , N. Note that certain event types may not occur in a given time interval. In these cases, $n(et_{mn})=0$. The analytics engine 312 computes an event-type probability for each of the N event types:

$$p_{mn} = \frac{n(et_{mn})}{N} \tag{5}$$

The analytics engine 312 forms an event-type probability distribution from event-type probabilities the m-th time interval:

$$P_m = (p_{m1}, p_{m2}, \ldots, p_{m,N-1}, p_{mN}) \tag{6}$$

where m=1, . . . , M.

The probability distribution in Equation (6) contains an event-type probability for each of the N event types that may occur in the m-th time interval. As a result, a number of the probabilities in the probability distribution (6) may be equal to zero. The analytics engine 312 assigns the class label of the KPI value to the corresponding probability distribution of the time interval and stores the probability distribution and the class label denoted by $(P_m, b)$, where $b \in \{0, 1\}$, in a data frame of a database.

Figure 11:
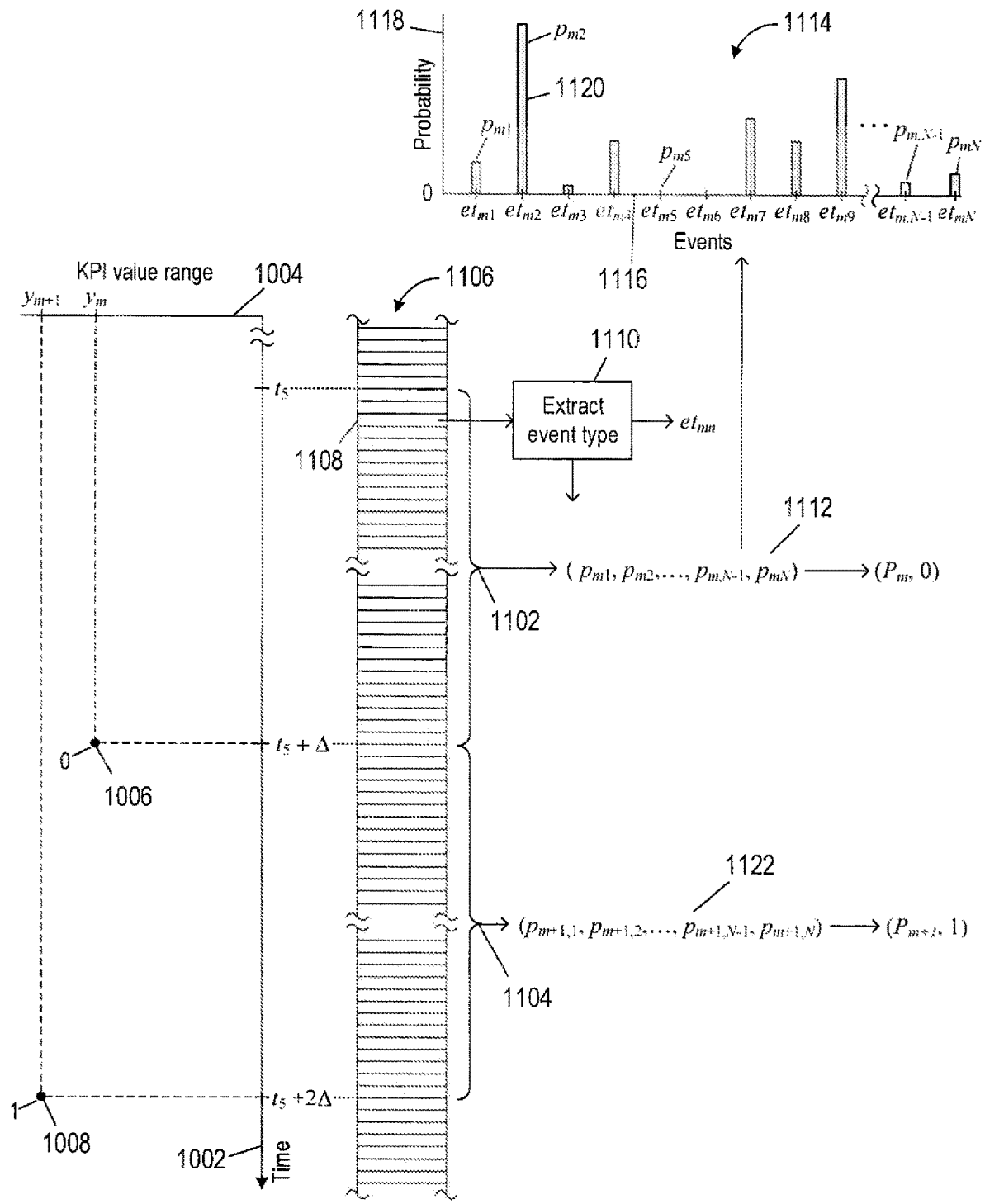
FIG. 11 shows construction of example event-type probability distributions.

FIG. 11 shows construction of example event-type probability distributions for two consecutive time intervals. FIG. 11 shows a portion of the time axis 1002 and the KPI values 1006 and 1008 shown in FIGS. 10A-10B. The duration of the time intervals between KPI values is denoted by $\Delta$. The time interval 1102 that precedes the KPI value 1006 is denoted by $[t_5, t_5+\Delta)$. The time interval 1104 that precedes the KPI value 1008 is denoted by $[t_5+\Delta, t_5+2\Delta)$. FIG. 11 also shows a portion of a log file 1106 that contains log messages with time stamps in the interval $[t_5, t_5+2\Delta)$. Each log message in the log file 1106 is represented by a rectangle. For example, rectangle 1108 represents a log message with a time stamp in the time interval $[t_5, t_5+\Delta)$ 1102. Block 1110 represents extraction of event types from a log message 1108 to obtain event type $et_{mn}$ by the even type engine 306 described above. The event type engine 306 extracts the event type from each of the log messages. The analytics engine 312 computes a probability distribution from the event types extracted in the time intervals as described above with reference to Equations (5) and (6). Probability distribution 1112 represents the probabilities of the event types in the time interval 1102. FIG. 11 shows an example plot 1114 of the probabilities of the probability distribution 1112. Horizonal line 1116 represents the range of event types. Vertical line 1118 represents the range of probabilities. Bars represent the probabilities of different event types. For example, bar 1120 represents the value of the probability $p_{m2}$ of the event type $et_{m2}$ occurring in the time interval 1102. The probability distribution 1112 includes zero probabilities that correspond to event types that did not occur in the time interval 1102. For example, the probability $p_{m5}$ of the event type $et_{m5}$ is zero because log messages with the event type $et_{m5}$ were not generated in the time interval 1102. Probability distribution 1122 represents the probabilities of the event types of log messages recorded in the time interval 1102.

The probability distributions are assigned the class label of the corresponding KPI value. For example, the class label "0" of the KPI value $y_m$ 1106 is assigned to the probability distribution $P_m$ 1112. The probability distribution $P_m$ 1112 and corresponding class label "0" are called a "distribution-label pair" denoted by $(P_m, 0)$. The outlier class label "1" of the KPI value $y_{m+1}$ 1108 is assigned to the probability distribution $P_{m+1}$ 1122. The distribution-label pair formed from the probability distribution $P_{m+1}$ 1122 and corresponding outlier class label "1" is denoted by $(P_{m+1}, 1)$.

Figure 12:
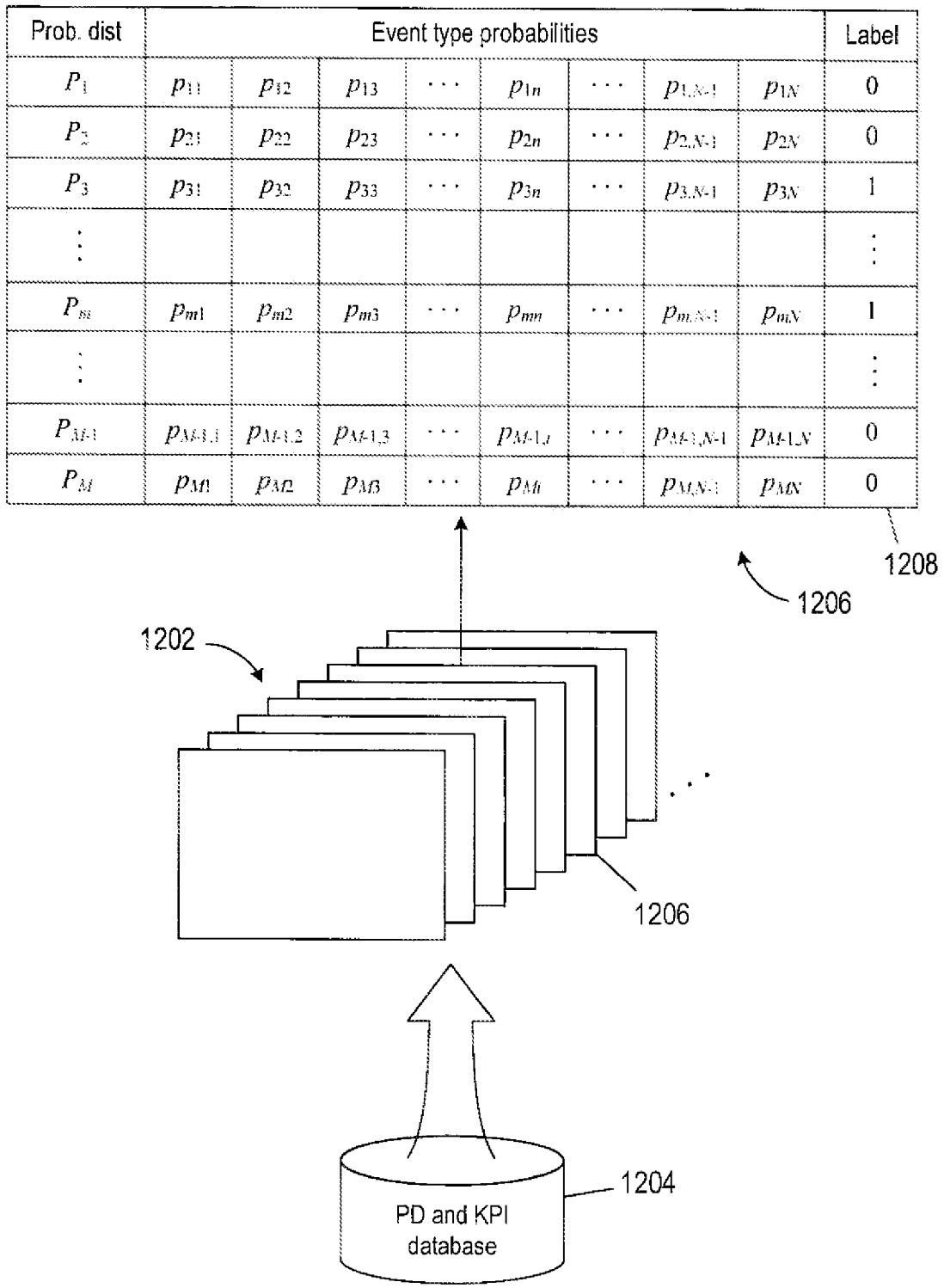
FIG. 12 shows an example data frame of probability distributions and KPI labels.

The analytics engine 312 stores the probability distributions and corresponding outlier class labels of each KPI in a data frame of a probability distributions and KPI database. FIG. 12 shows an example data frame 1202 of probability distributions and KPI labels. The data frame 1202 is persisted in a probability distributions and KPI database 1204. Probability distributions and KPI labels of different KPIs are stored in separate data frames. FIG. 12 also shows an enlargement of a data frame 1206 that records M probability distributions and corresponding class labels of KPI values. Column 1208 records the class labels of the KPI values and is denoted by b. Each column contains the event-type probabilities of a particular event type $et_n$. Each row contains the event-type probabilities of a probability distribution associated with one of the class labels.

A typical data frame contains may contain thousands of probability distributions. Each distribution contains many event-type probabilities associated with the event types. Data frames may also contain many redundant event-type probabilities and unimportant event-type probabilities. The analytics engine 312 trains random forest model, denoted by $F_j$, where j is random forest model index. Each random forest model $F_j$ is composed of a set of random forest trees $\{T_k\}_1^{K_j}$, where $T_k$ denotes a random forest tree. Each random forest model $F_j$ has an associated number of random forest trees ($K_j$), a depth of the random forest trees ($D_j$), and number of event-type probabilities ($E_j$). The parameters of the j-th random forest model $F_j$ are denoted by the tuple ($K_j$, $D_j$, $E_j$). The analytics engine 312 uses hyper-parameter tuning via cross-validation described below to determine the optimal random forest parameters (K, D, E), where K is maximum number of random forest trees, D is the maximum depth of the random forest trees, and E is the maximum number of important event-type probabilities.

Cross-validation is a resampling technique that uses different portions of the data frame 1206 to train a different random forest model $F_j^{(l)}$ for the parameters ($K_j$, $D_j$, $E_j$). The optimal set of values for the maximum number of random forest trees (K), maximum depth of the random forest trees (D), and the maximum number of important event-type probabilities (E) is determined using prediction scoring, such as area under receiver operating characteristic curve ("ROC AUC") scoring or an F1-score, as described below. Cross-validation tests the ability of a trained random forest model to correctly predict the classification of a probability distribution that was not used to train the random forest model, in order to identify problems and to obtain insight on how well the random forest model performs for a particular combination of parameters ($K_j$, $D_j$, $E_j$). Each round of cross-validation includes partitioning the data frame 1206 into a training and a validation dataset of probability distributions.

With cross validation, the set of probability distributions $\{P_m\}_1^M$ and corresponding class labels b are randomized and divided into q groups called "folds" of approximately equal size, where q is a positive integer. A fold is denoted by $(\overline{P}_l, \overline{b}_l)$, where the overbar denotes a subset of probability distributions of the data frame 1206 with corresponding class labels $\overline{b}_l$ and subscript l is a fold index with l=1, . . . , q. For each fold l, $(\overline{P}_l, \overline{b}_l)$ is treated as a validation dataset, and a random forest model denoted by $F_j^{(l)}$ is fit to the remaining q−1 folds. For the l-th fold, estimated class labels are computed with $F_j^{(l)}(\overline{P}_l) = \hat{b}_l$, where $\hat{b}_l$ is composed of estimated class labels of the actual class labels $\overline{b}_l$.

Figure 13A:
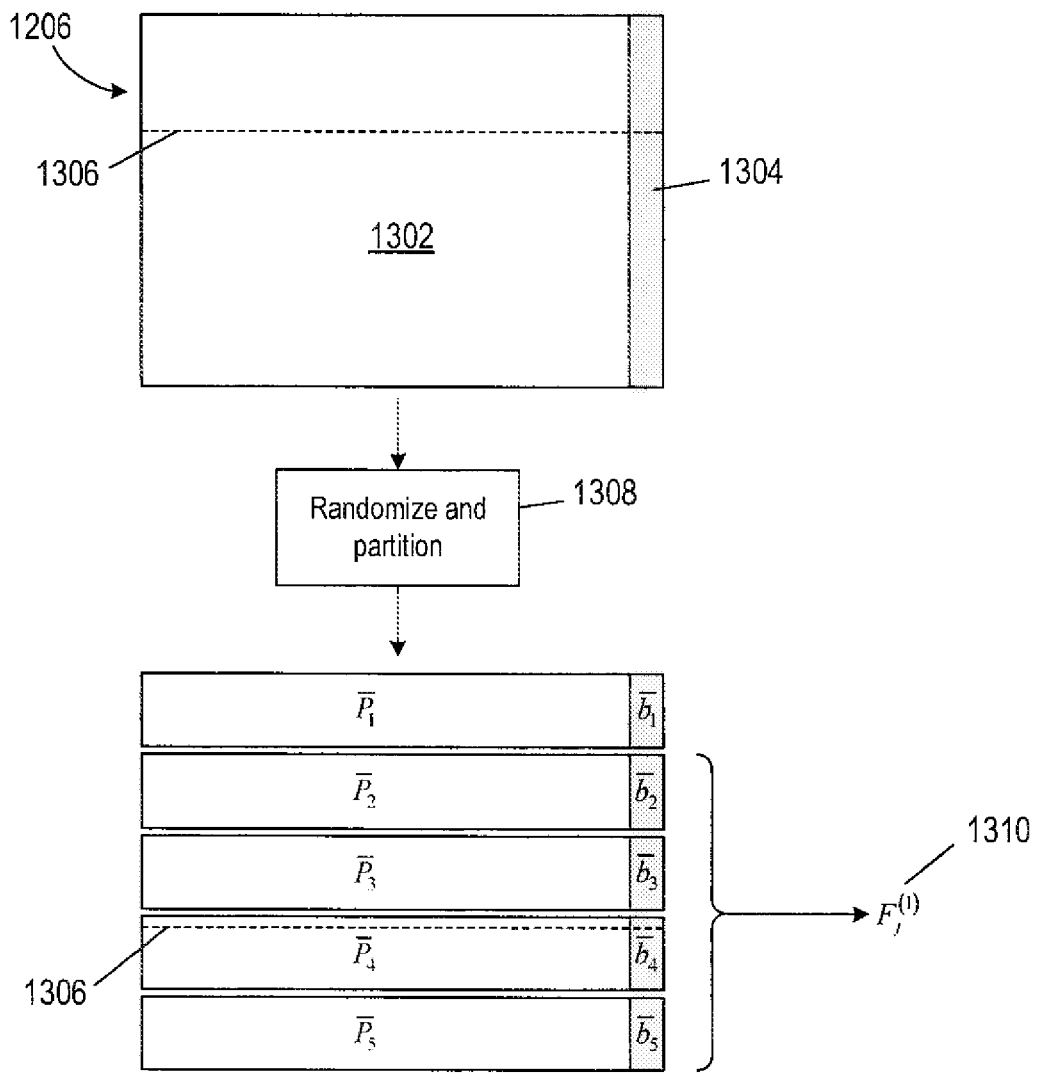
FIGS. 13A-13E show of an example of 5-fold cross validation applied to the probability distributions and class labels of the data frame.
Figure 13B:
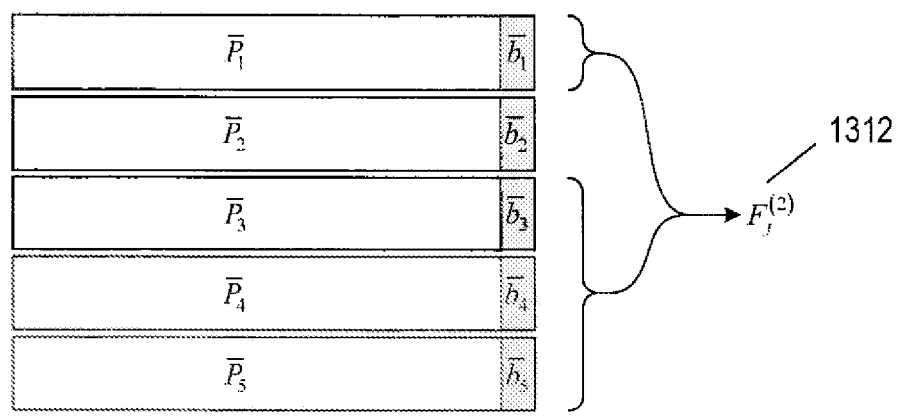
Figure 13C:
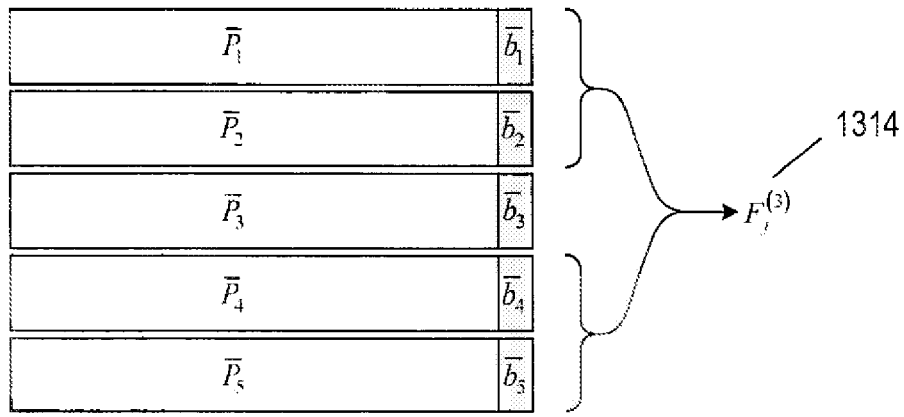
Figure 13D:
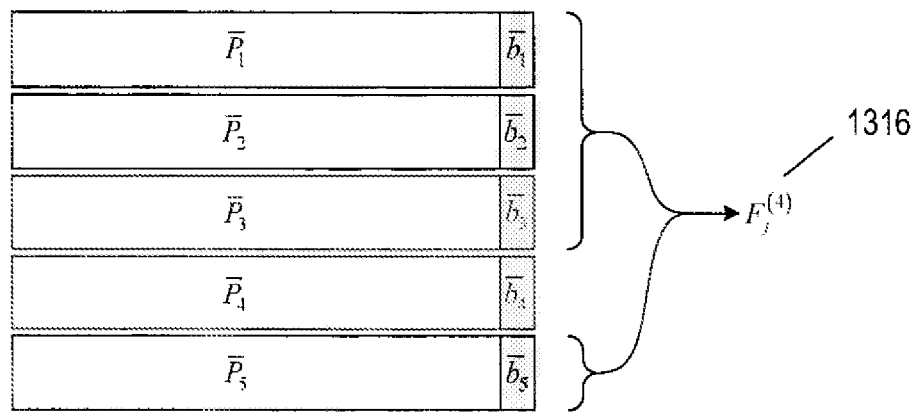
Figure 13E:
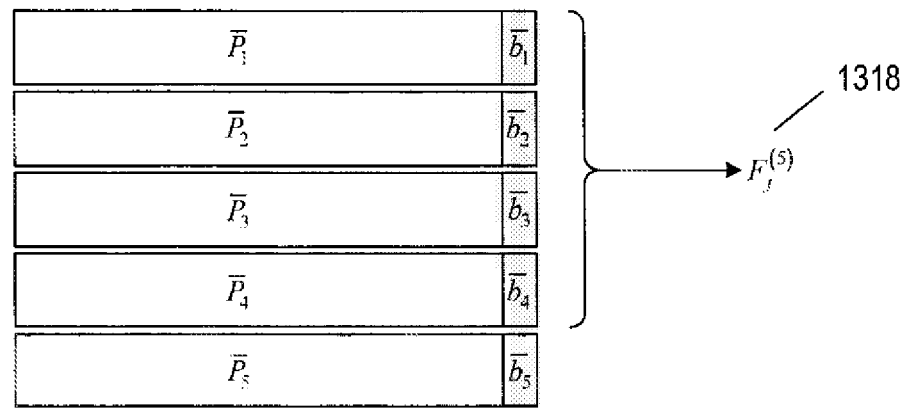

FIGS. 13A-13E show of an example of 5-fold cross validation applied to the probability distributions and class labels of the data frame 1206. Unshaded region 1302 represents the event-type probabilities of the data frame 1206 and shaded region 1304 represents the corresponding class labels 1208. Dotted line 1306 represents a probability distribution of event-type probabilities and a corresponding class label. For example, dotted line 1306 may represent the probability distribution $P_m$ and the corresponding class label "1" in FIG. 12. In block 1308, the order of the probability distributions and corresponding class labels are randomized and partitioned into 5-folds. The probability distributions of the 5-folds are denoted by $\overline{P}_1$, $\overline{P}_2$, $\overline{P}_3$, $\overline{P}_4$, and $\overline{P}_5$ and the corresponding class labels are denoted by $\overline{b}_1$, $\overline{b}_2$, $\overline{b}_3$, $\overline{b}_4$, and $\overline{b}_5$. Randomization scrambles the probability distributions and corresponding class labels. For example, in FIG. 13A, randomization places the probability distribution and the corresponding class label represented by dashed line 1306 in the fourth fold $(\overline{P}_4, \overline{b}_4)$. For the first iteration in FIG. 13A, the first fold $(\overline{P}_1, \overline{b}_1)$ is the validation dataset and a random forest model $F_j^{(1)}$ 1310 is trained as described below with reference to FIGS. 14A-14B using the folds $(\overline{P}_2, \overline{b}_2)$, $(\overline{P}_3, \overline{b}_3)$, $(\overline{P}_4, \overline{b}_4)$, and $(\overline{P}_5, \overline{b}_5)$ as a training set. The trained random forest model $F_j^{(1)}$ is applied to the probability distribution $\overline{P}_1$ to obtain predicted class labels $\hat{b}_1$ (i.e., $F_j^{(1)}(\overline{P}_1) = \hat{b}_1$). For the second iteration in FIG. 13B, the second fold $(\overline{P}_2, \overline{b}_2)$ is the validation dataset and a random forest model $F_j^{(1)}$ 1312 is trained as described above with reference to FIGS. 14A-14B using the folds $(\overline{P}_1, \overline{b}_1)$, $(\overline{P}_3, \overline{b}_3)$, $(\overline{P}_4, \overline{b}_4)$, and $(\overline{P}_5, \overline{b}_5)$ as a training set. The trained random forest model $F_j^{(2)}$ is applied to the probability distribution $\overline{P}_2$ to obtain predicted class labels $\hat{b}_2$ (i.e., $F_j^{(1)}(\overline{P}_2) = \hat{b}_2$). In FIGS. 13C-13E, the same process is repeated to train random forest models $F_j^{(3)}$ 1314, $F_j^{(4)}$ 1316, and $F_j^{(5)}$ 1318 where the folds $(\overline{P}_3, \overline{b}_3)$, $(\overline{P}_4, \overline{b}_4)$, and $(\overline{P}_5, \overline{b}_5)$ are corresponding validation datasets. The trained random forest models $F_j^{(3)}$ 1314, $F_j^{(4)}$ 1316, and $F_j^{(5)}$ 1318 are applied to the probability distributions $\overline{P}_3$, $\overline{P}_4$, and $\overline{P}_5$, respectively, to obtain corresponding predicted class labels $\hat{b}_3$, $\hat{b}_4$, and $\hat{b}_5$.

The random forest trees $\{T_k\}_1^{K_j}$ that compose the random forest model $F_j^{(l)}$ are trained using bootstrap aggregation, or "bagging," of the training dataset. Bagging repeatedly selects a random sample of the distribution-label pairs with replacement and creates a random forest tree from the random sample. A random forest model $F_j^{(l)}$ is constructed using the following pseudocode:

For k=1, . . . , $K_j$:
    Draw a bootstrap sample of J (i.e., J<M) distribution-label pairs with replacement from the set of distribution-label pairs.
    Grow a random-forest tree $T_k$ to the bootstrap sample by recursively repeating the following steps for each node of the tree:
        Randomly select n event-type probabilities from the N event types.
        Identify a best event-type split point among the n event types.
        Split the node into two daughter nodes.

The bootstrap sample in line 2 of the pseudocode is formed by randomly sampling J distribution-label pairs from the larger set of M distribution-label pairs to form a set of J randomly sampled distribution-label pairs. The set of J randomly sampled distribution-label pairs is sampled with replacement to obtain M-J distribution-label pairs. The bootstrap sample is formed by combining the set of J randomly sampled distribution-label pairs with the M-J distribution-label pairs randomly sampled with replacement from the set of J randomly sampled distribution-label pairs. The resulting bootstrap sample contains distribution-label pairs with repeats of certain distribution-label pairs. The number of n randomly selected event types in line 6 of the pseudocode is a fraction of the N event types. For example, the number n can be set to n=√N (rounded down). Lines 7 and 8 of the pseudocode are implemented using any one of many different machine learning decision tree algorithms, such as classification and regression tree ("CART"), iterative dichotomiser 3 ("ID3"), C4.5, and C5.0.

Figure 14A:
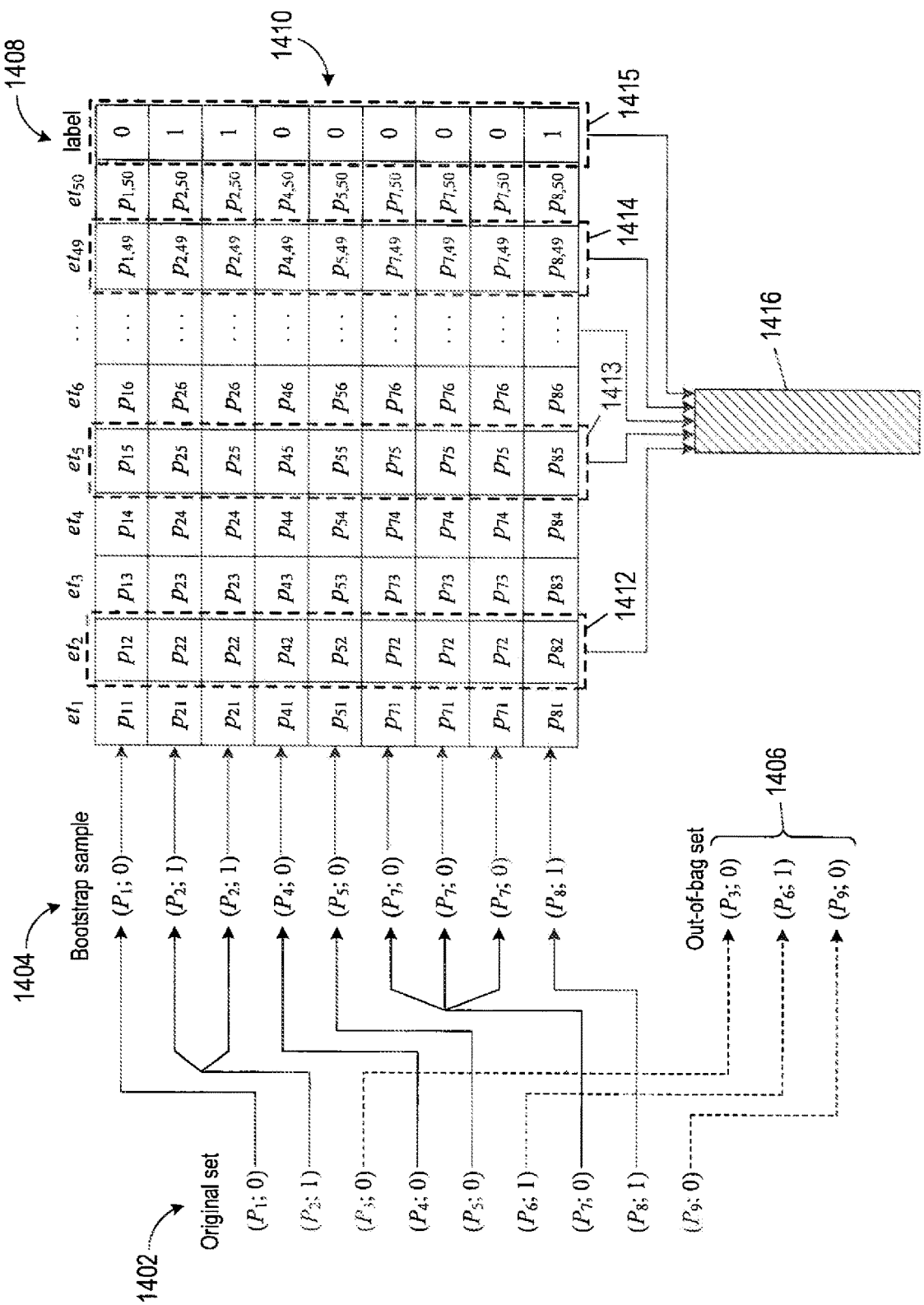
FIG. 14A shows an example of forming a bootstrap sample of distribution-label pairs and a random selection of event-type probabilities from the bootstrap sample.

FIG. 14A shows an example of forming a bootstrap sample of distribution-label pairs and a random selection of event-type probabilities from the bootstrap sample. In this example, nine (i.e., $K_j$=9) distribution-label pairs 1402 comprise an original set of distribution-label pairs of a training dataset. For the sake of simplicity of explanation, a small original set of distribution-label pairs is provided. In practice, the actual number of distribution-label pairs in a training dataset is typically in the thousands. Six (i.e., J=6) distribution-label pairs are randomly sampled from the training dataset with replacement to form a bootstrap sample 1304 that also contains nine distribution-label pairs. The set of six randomly sampled distribution-label pairs are ($P_1$; 0), ($P_2$; 1), ($P_4$; 0), ($P_5$; 0), ($P_7$; 0), and ($P_8$; 1). The set of six randomly sampled distribution-label pairs is randomly sampled three times. In this example, the distribution-label pair ($P_2$; 1) is randomly selected and distribution-label pair ($P_7$; 0) is randomly sampled twice from the set of six randomly sampled distribution-label pairs. The bootstrap sample 1404 is formed by combining the set of six randomly sampled distribution-label pairs with the three distribution-label pairs randomly sampled from the set of six randomly sampled distribution-label pairs. The distribution-label pairs that are not randomly sampled from the original set of distribution-label pairs 1402 form an out-of-bag set of distribution-label pairs 1406. The out-of-bag set of distribution-label pairs 1406 are used to determine final importance-scores via permutation feature importance as described below. Table 1408 shows an example set of event-type probabilities and corresponding class labels of the distribution-label pairs 1404. For the sake of simplicity of explanation, the distribution-label pairs contain 50 event-type probabilities (i.e., N=50). For example, row 1410 contains the event-type probabilities $p_{5n}$, where n=1, ..., 50, and class label "0" of the distribution-label pair ($P_5$; 0). In practice, the actual number of event types is typically in the thousands. In this example, the number of randomly selected event types is √50=7.071067..., which is rounded down to 7. Dashed boxes 1412-1414 identify event-type probabilities of three of seven randomly selected event types from the 50 event types. The four remaining event-type probabilities are randomly selected from the event-type probabilities represented by ellipses in table 1408. Hash-marked rectangle 1416 represents the event-type probabilities of the seven randomly selected event types and the corresponding class labels identified by dashed box 1415. FIG. 14B shows an example of event-type probabilities of the seven randomly selected event types and the corresponding class labels 1316.

The event-type probabilities of the n randomly selected event types are used to create the nodes of a random forest tree $T_k$ in lines 4 and 5 of the pseudocode. Each node of the tree $T_k$ represents an event-type probability and a best event-type split point on that event-type probability. The leaf nodes of the tree $T_k$ contain the class labels "0" and "1", which are used to make a class prediction. In line 6 in the pseudocode above, event-type probabilities of a set of n randomly selected event types are used to determine a conditional statement represented by a node added to the tree $T_k$.

Figure 15A:
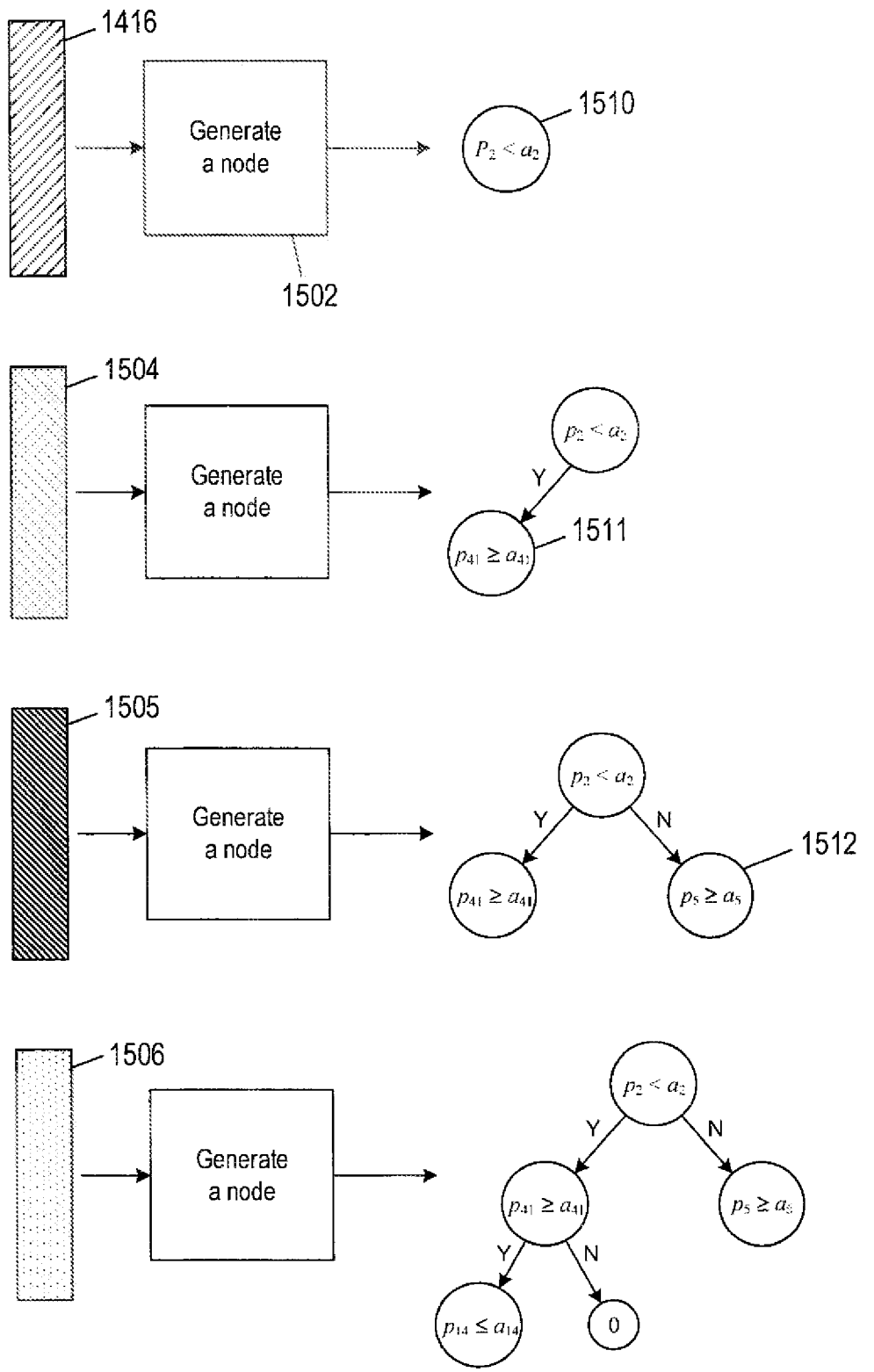

FIGS. 15A-15B show an example of constructing a random forest tree from event-type probabilities of different randomly sets of event types as described in line 6 of the pseudocode. In FIGS. 15A-15B, blocks, such as block 1502, represent the operation of adding nodes to the decision tree using one of the different machine learning decision tree algorithms. Each node is added using the event-type probabilities of seven event types randomly selected from the 50 event types. Differently shaded or hash-marked boxes 1416, 1504-1509 represent event-type probabilities of different sets of seven event types randomly selected from the 50 event types in table 1408. In other words, each of the event-type probabilities 1416, 1504-1509 corresponds to seven randomly selected event types from the 50 event types in table 1408. In FIG. 15A, the event-type probabilities 1416 of the seven different event types randomly selected as described above with reference to FIGS. 14A-14B are used to generate a root node 1510. A different set of event-type probabilities 1504 are used to add the internal node 1511. A different set of event-type probabilities 1405 are used to add the internal node 1512. Note that the leaf nodes are the class labels "0" or "1." In other words, each path in the random forest tree terminates at a leaf node with a class label "0" or "1." FIG. 15B shows a final random forest tree 1514 denoted by $T_1$. The machine learning decision tree algorithm determines for each node a numerical threshold value that forms a conditional statement with an event-type probability. For example, root node 1510 contains a threshold $a_2$ and a conditional statement $p_2 < a_2$.

When CART is used to construct the tree $T_k$, the best event-type split at each node, τ, of a random forest tree is determined by the total Gini impurity:

$$I_{TG}(\tau) = w_L I_G(\tau_L) + w_R I_G(\tau_R) \qquad (7)$$

where
$w_L$ is the weight of the left-hand daughter node $\tau_L$;
$I_G(\tau_L)$ is the Gini impurity of the left-hand daughter node $\tau_L$;
$w_R$ is the weight of the right-hand daughter node $\tau_R$; and
$I_G(\tau_R)$ is the Gini impurity of the right-hand daughter node $\tau_R$.

The Gini impurity at a node is given by $$I_G(\tau) = 1 - (p_0^2 + p_1^2) \qquad (8)$$

where
$p_0 = n_0/n_{et}$ is the fraction of the $n_0$ event-type probabilities corresponding to class label 0;
$p_1 = n_1/n_{et}$ is the fraction of the $n_1$ event-type probabilities corresponding to class label 1; and
$n_{et} = n_0 + n_1$.

The Gini impurity in Equation (7) is a weighted average of Gini impurity in Equation (8) of the left-hand and right-hand daughter nodes. The weights satisfy the condition $w_L + w_R = 1$. The weight, $w_L$, is the fraction of event-type probabilities that reach the left-hand daughter node $\tau_L$. The weight, $w_R$, is the fraction of event-type probabilities that reach the right-hand daughter node $\tau_R$. Alternatively, the classes {0, 1} are balanced by using weights that are inversely proportional to frequencies of the class labels "0" and "1" in the training data. The event-type probability that gives the smallest total Gini impurity is selected for the node. Note that the leaf nodes are the class labels "0" or "1" of the random forest decisions correspond to a Gini impurity of zero. The ID3, C4.5, and C5.0 machine learning decision tree algorithms use information gain, which is based on entropy and information content, to determine splits at the nodes.

The analytics engine 312 builds $K_j$ different random forest trees. Each random forest tree is built from a different bootstrap sample of randomly selected distribution-label pairs as described above with reference to FIG. 14A. The $K_j$ bootstrap samples are denoted by $BS_k$, where k=1, ..., $K_j$. Each bootstrap sample $BS_k$ is used to build a corresponding random forest tree $T_k$ using one of the machine learning decision tree algorithms as described above with reference to FIGS. 15A-15B.

Figure 16:
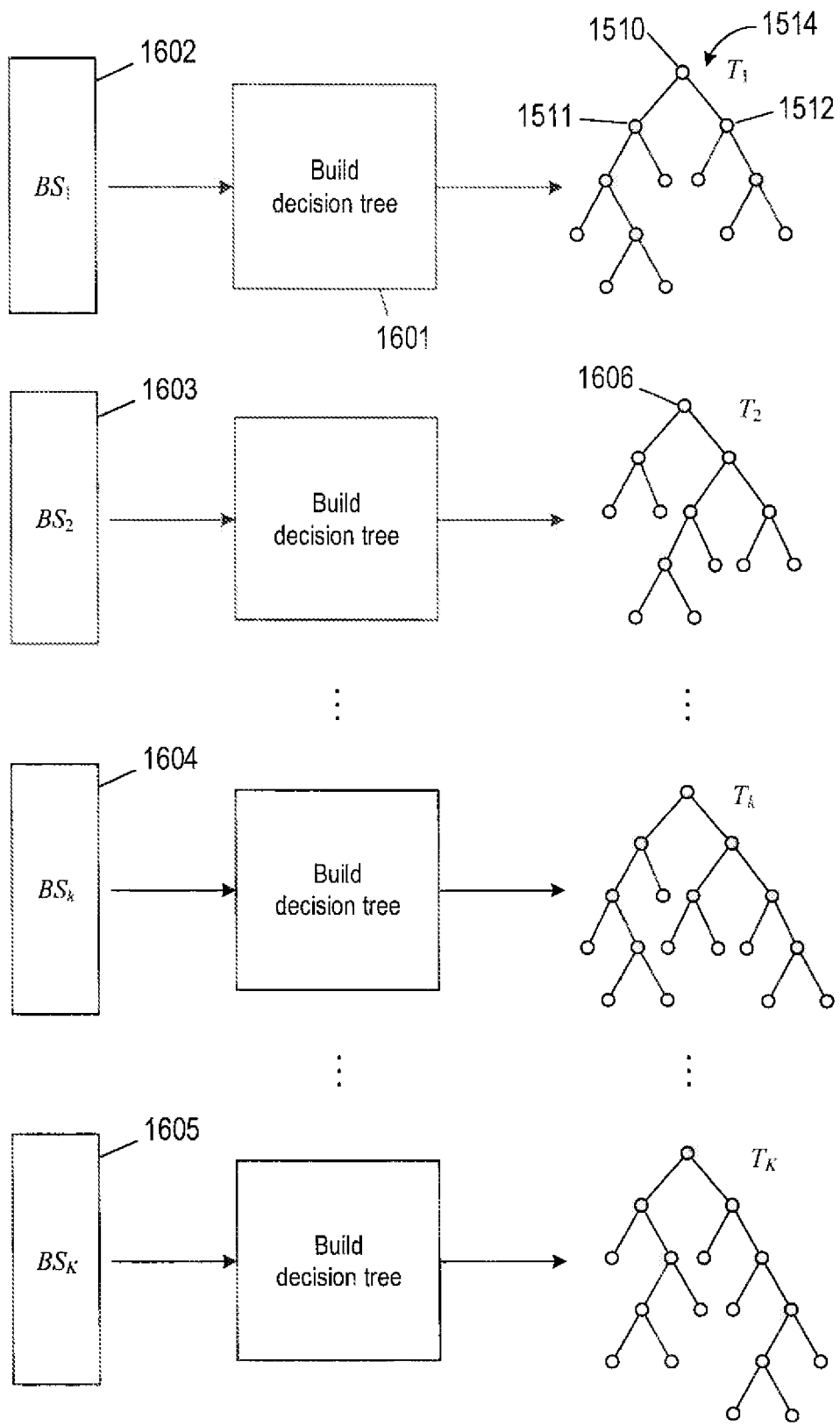
FIG. 16 shows an example of random forest trees of a random forest model.

FIG. 16 shows an example of random forest trees $\{T_k\}_1^{K_j}$ of the random forest model $F_j^{(l)}$ built as described in lines 2-8 of the pseudocode. Blocks identified as build decision tree, such as block 1601, represent the process of building a single random forest tree as described in lines 2-8 of the pseudocode and with reference to corresponding FIGS. 15A-15B. For example, build decision tree block represent any of the machine learning decision tree algorithms CAST, ID3, C4.5, and C5.0. Blocks 1602-1605 represent four of $K_k$ different bootstrap samples. For example, block 1602 represents the bootstrap sample 1404 in FIG. 14A and is denoted by $BS_1$. Block 1603 represents a different bootstrap sample obtained from randomly sampling J distribution-label pairs based on replacement and is denoted by $BS_2$. As shown in FIG. 16, each bootstrap sample is input to the build decision tree process. Different bootstrap samples $BS_1$, $BS_2$, ..., $BS_{K_j}$ produce different corresponding random forest trees represented by $T_1$, $T_2$, ..., $T_{K_j}$. For example, bootstrap sample $BS_1$ 1602 is input to build decision tree process 1601 which outputs random forest tree $T_1$ shown in FIG. 15B. Bootstrap sample $BS_2$ 1603 is input to build decision tree process 1601 which outputs random forest tree $T_2$. Bootstrap sample $BS_{K_j}$ 1503 is input to build decision tree process 1501 which outputs random forest tree $T_{K_j}$. The random forest tree $T_2$ is different from the random forest tree $T_1$. For example, root node 1606 represents a conditional statement that corresponds to an event-type probability that may be different from the event-type probability of the conditional statement represented by root node 1510.

The analytics engine 312 executes hyper-parameter tuning using a cost function to determine an optimal set of values for the number of random forest trees, maximum depth of trees, and the number of maximum event types. Hyper-parameter tuning optimizes prediction scores, such as the F1-score and ROC AUC.

Computation of the F1-score and ROC AUC depend on construction of a confusion matrix obtained from applying the trained random forest models to corresponding validation datasets. Each column of the confusion matrix represents the instances in an actual class of the validation datasets while each row represents the instances in a predicted class output from the random forest models.

Figure 17:
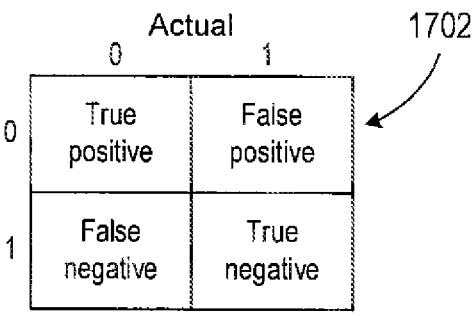
FIG. 17 shows an example of a confusion matrix.

FIG. 17 shows an example of a confusion matrix 1702. In this example, actual class labels "0" and "1" label the columns of the confusion matrix 1702. Predicted class labels "0" and "1" label the rows of the confusion matrix 1702. The term "positive" refers to the class label "0," and the term "negative" refers to the class label "1." Entries in the confusion matrix correspond to true positive, false positive, false negative, and true negative counts obtained from applying the trained random forest models to corresponding validation data sets. True positive is a count of the number of times the trained random forest models correctly predicted the class label "0." True negative is a count of the number of times the trained random forest models correctly predicted the class label "1." False positive is a count of the number of times the trained random forest models incorrectly predicted the class label "0." True negative is a count of the number of times the trained random forest models incorrectly predicted the class label "1." Let $\{(P_a^{Vi}, b_a)\}_1^A$ represent a validation dataset associated with the random forest model $F_j^{(i)}$, where A is the number of probability distributions in the validation dataset, a=1, ..., A, i=1, ..., q, superscript V identifies the $P_a^{Vi}$ as one of the probability distributions in the validation dataset associated with the trained random forest model $F_j^{(i)}$, and $b_a$ is the class label associated with $P_a^{Vi}$. The true positive, false positive, false negative, and true negative counts are obtained by applying the trained random forest models to corresponding validation datasets denoted by $F_j^{(i)}(P_a^{Vi})$.

Figure 18A:
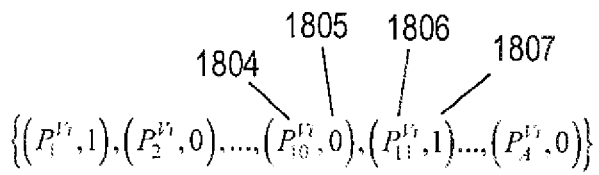
FIGS. 18A-18C show an example of determining true positive, false positive, false negative, and true negative class label predictions.
Figure 18B:
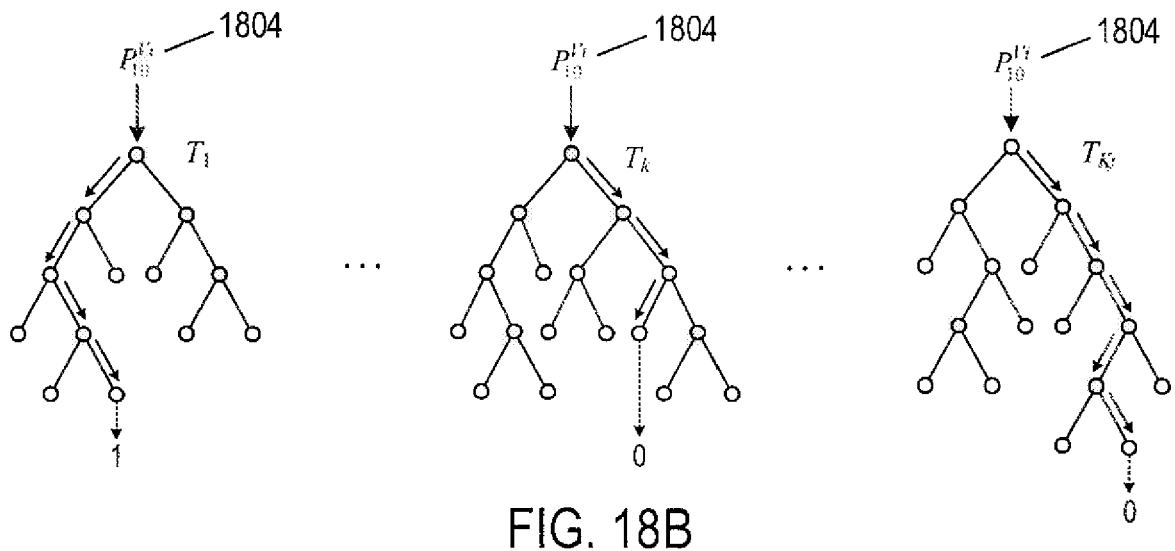
Figure 18C:
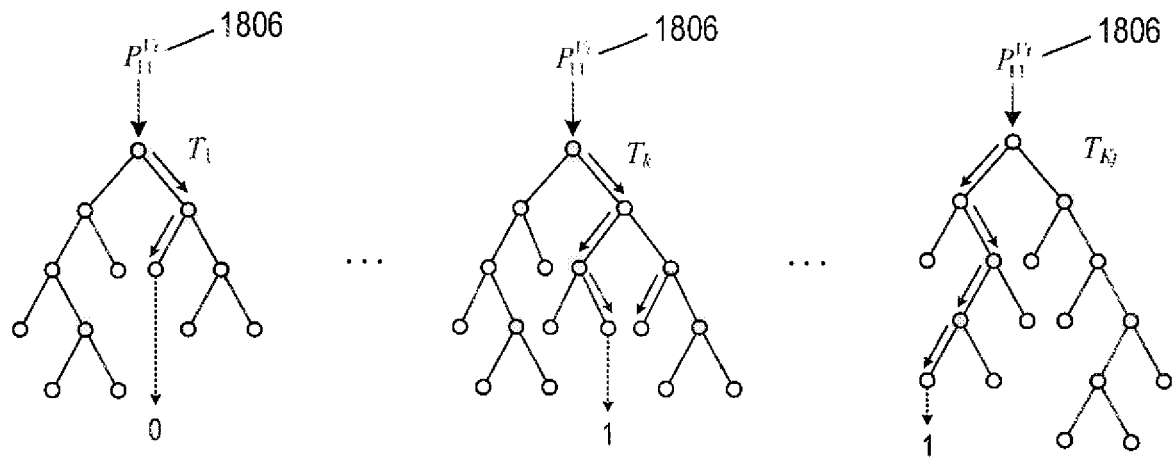

FIGS. 18A-18C show an example of determining true positive, false positive, false negative, and true negative class label predictions for $F_j^{(i)}(P_a^{Vi})$. FIG. 18A shows the example validation dataset $\{(P_a^{Vi}, b_a)\}_1^A$ 1802 with examples of corresponding actual class labels. For example, the probability distribution $P_{10}^{Vi}$ 1804 has an actual class label "0" 1805 (a positive), and the probability distribution $P_{11}^{Vi}$ 1806 has an actual class label "1" 1807 (a negative). Each of the probability distributions of the validation dataset 1802 is run through the random forest trees of the corresponding trained random forest model $F_j^{(i)}$ and a count of the number of true positive, false positive, false negative, and true negative are determined. For example, in FIG. 18B, the probability distribution $P_{10}^{Vi}$ is run through random forest trees $T_1$, $T_k$, and $T_{K_j}$. Ellipses represent random forest trees that are not shown for the sake of illustration. Directional arrows located along the edges of the trees represent paths determined by comparing the event-type probabilities of the probability distribution $P_{10}^{Vi}$ 1804 with conditional statements represents by the internal nodes. Each path ends at a leaf node that determines a predicted class label for the probability distribution $P_{10}^{Vi}$. For example, random forest tree $T_1$ produces a predicted class label "1," which is a false negative. Random forest trees $T_k$ and $T_{K_j}$ both produce predicted class label "0," which are true positives. In FIG. 18C, the probability distribution $P_{11}^{Vi}$ 1806 is run through random forest trees $T_1$, $T_k$, and $T_{K_j}$. In this case, random forest tree $T_1$ produces a predicted class label "0," which is a false positive. Random forest trees $T_k$ and $T_{K_j}$ both produce predicted class label "1," which are true negatives.

The process described above with reference to FIGS. 18A-18C is repeated to obtain a confusion matrix for the q-fold random forest models $F_j^{(l)}$, where l=1, ..., q, using the validation datasets associated with the different folds. The confusion matrix contains combined true positive, false positive, false negative, and true negative counts obtained for each of the folds. For example, the true positive counts obtained each of the random forest models $K_j^{(1)}, \ldots, F_j^{(q)}$ are summed to give the true positive count of the confusion matrix. The elements of the confusion matrix are used to compute an F1-score or a ROC AUC.

FIG. 19 shows the formula for the F1-score 1902 as a function of precision 1904 and recall 1906. The precision 1904 is a function of the true positive counts, denoted by "True_positive," and false positive counts, denoted by "False_positive," of the confusion matrix computed for the random forest models $F_j^{(1)}, \ldots, F_j^{(q)}$. The recall 1906 is a function of the true positive counts, "True_positive," and false negative counts, denoted by "False_negative," of the confusion matrix computed for the random forest models $F_j^{(1)}, \ldots, F_j^{(q)}$. The F1-score of the q-fold random forest models is computed for different variations of the number of random forest trees ($K_j$), depth of the random forest trees ($D_j$), and number of event-type probabilities ($E_j$). The number of random forest trees ($K_j$), depth of the random forest trees ($D_j$), and number of event-type probabilities ($E_j$) with the largest corresponding F1-score is the optimal number of random forest trees, depth of the random forest trees, and number of event-type probabilities (K, D, E).

FIG. 20 shows an example of computing the ROC and AUC in ROC AUC. The ROC curve is composed of a set of 2-tupes denoted by (true_positive_rate, false_negative_rate). The "true_positive_rate" 2002 corresponds to recall (i.e., recall 1906 in FIG. 19), or probability of detection. The "false_negative_rate" 2004 is the probability of a false alarm. FIG. 20 shows an example plot 2006 of an ROC curve 2008 of the q-fold random forest models computed for different variations of the number of random forest trees ($K_j$), depth of the random forest trees ($D_j$), and number of event-type probabilities ($E_j$). For example, the ROC curve 2008 may be determined for various numbers of random forest trees while the depth of the random forest trees and number of event-type probabilities are held constant. The AUC (area under the ROC curve) is computed for each ROC curve. For example, in FIG. 20, shaded region 2010 represents the AUC of the ROC curve 2008. The AUC may be computed using any one of various numerical techniques, including Lagrange interpolating polynomials, Newton-Cotes formula, trapezoid rule, or Simpson's rule. The number of random forest trees ($K_j$), depth of the random forest trees ($D_j$), and number of event-type probabilities ($E_j$) that corresponds to the largest AUC is the maximum number of random forest trees, maximum depth of the random forest trees, and maximum number of event-type probabilities (K, D, E).

A random forest model $F=\{T_1, \ldots, T_K\}$ is iteratively trained within the limitations of maximum number of random forest trees, maximum depth of the random forest trees, and maximum number of event-type probabilities using the out of the bag probability-label pairs. For each iteration, event types having an importance score below an importance threshold, $Th_{imp}$, are removed for the next round of random forest model construction until none of the importance scores of the event types are below the importance threshold. For example, the importance threshold $Th_{imp}$ may be set to 0 or a small number, such as $10^{-2}$, $10^{-3}$, $10^{-4}$, or $10^{-5}$. The importance score of an event type is given by $$I_G(et) = \sum_T \sum_\tau \Delta I_{et}(\tau, T) \quad (9)$$

where
$\Delta I_{et}(\tau, T) = I_G(\tau, T) - p_L I_G(\tau_L, T) - p_R I_G(\tau_R, T)$;
$p_L = n_L/n_{et}$ is the left-hand sample fraction; and
$p_R = n_R/n_{et}$ is the left-hand sample fraction.

In Equation (9), the outer summation is a sum over the random forest trees of the random forest tree model. The inner summation is a sum over the nodes $\tau$. The quantity $I_G(\tau, T)$ is the Gini impurity at the node $\tau$ of the random forest tree T computed according to Equation (8). The quantities $I_G(\tau_L, T)$ and $I_G(\tau_R, T)$ are the Gini impurities of the left-hand and right-hand daughter nodes of the node T of the random forest tree T computed according to Equation (8). Event types with importance scores $I_G(et) \geq Th_{imp}$ are retained for the next iteration. Event types with importance scores $I_G(et) < Th_{imp}$ are discard and not retained for the next iteration.

Figure 21:
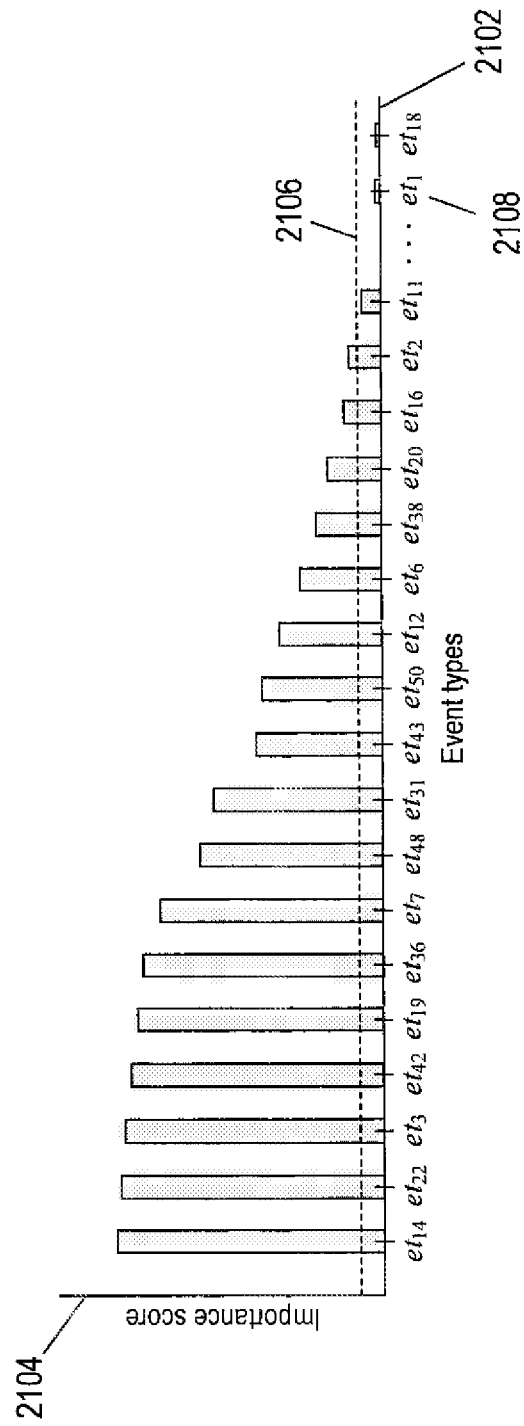
FIG. 21 shows an example of importance scores for features after an iteration.

FIG. 21 shows an example of importance scores for features after an iteration. Horizontal axis 2102 is an event type axis with regularly spaced marks corresponding to event types. Vertical line 2104 represents an importance score range. Bars represent importance scores computed for each of the event types identified along the event type axis 2102. Dashed line 2106 represents the importance threshold $Th_{imp}$. In this example, event type with corresponding importance scores that are greater than the importance threshold $Th_{imp}$ are used in the next iteration. By contrast, event types with importance scores below the importance threshold $Th_{imp}$, such as event type $et_1$ 2108, are not included in the next iteration of random forest model construction.

Permutation feature importance is executed to remove any possible bias. Permutation feature importance is a model inspection technique that estimates the decrease of a model score when the event-type probability of an event type is randomly shuffled following generating a random forest model. This procedure breaks the relationship between the event type and the class label. As a result, a drop in the model score is indicative of how much the model depends on the event type. Permutation feature importance can be calculated many times with different permutations of the event-type probability of an event type.

Figure 22A:
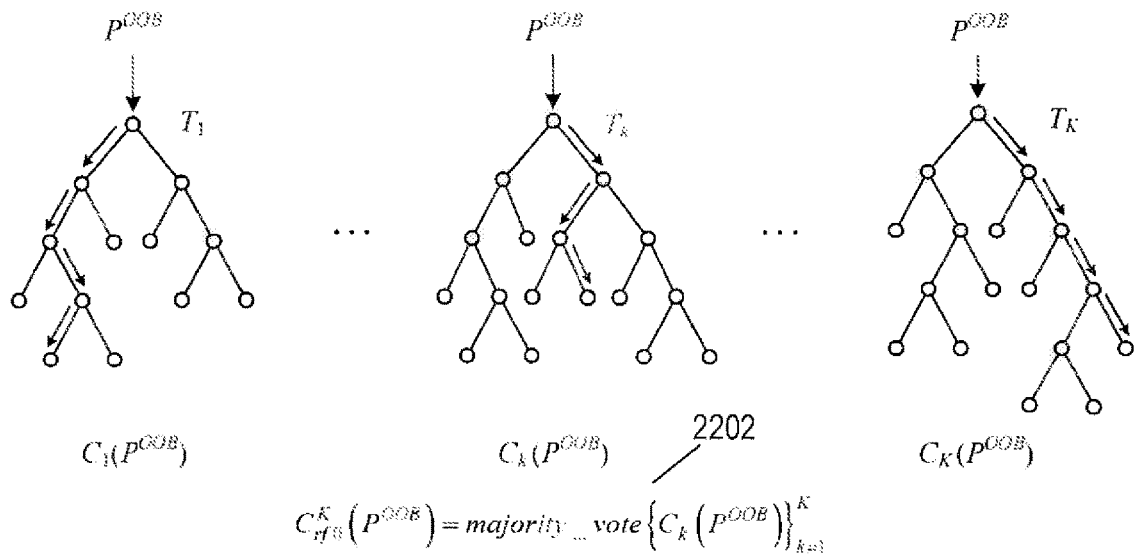
FIGS. 22A-22B show an example of permutation feature importance.
Figure 22B:
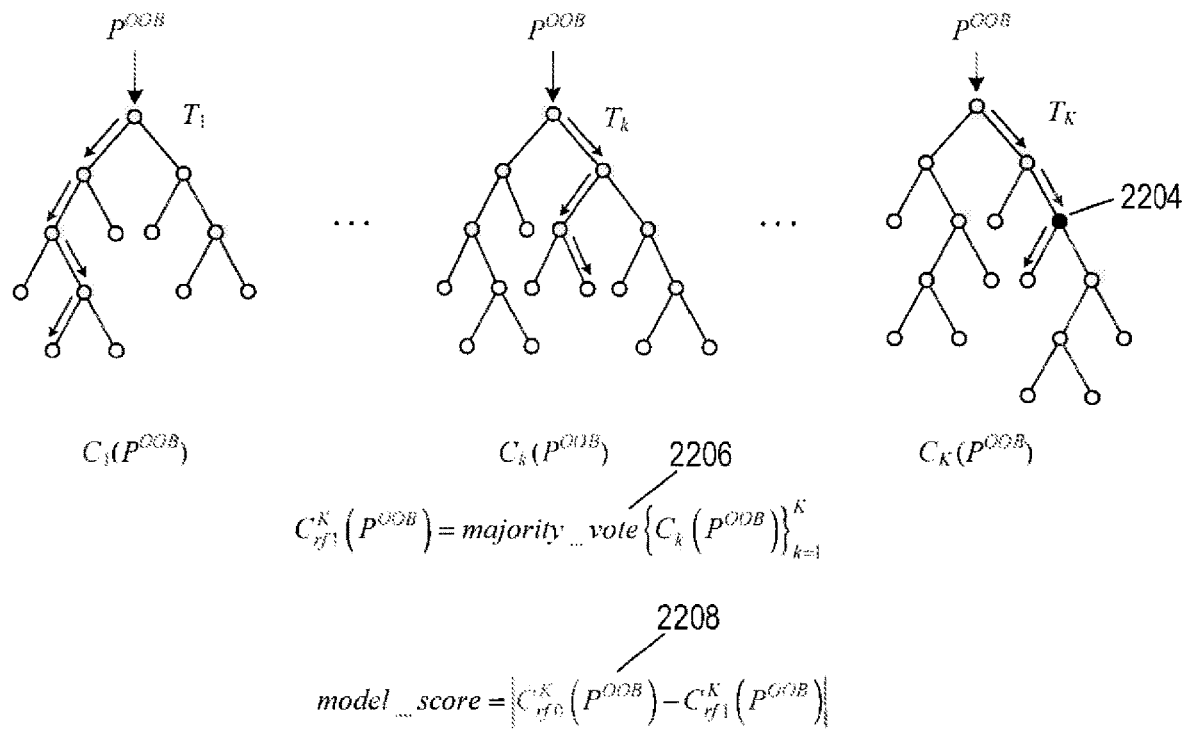

FIGS. 22A-22B show an example of permutation feature importance. FIG. 22A shows an example of random forest model obtained as described above. The random forest model is composed of a set of K random forest trees $\{T_1, \ldots, T_K\}$. In this example, $p^{OOB}$ represents an out-of-the-bag probability distribution. The out-of-the bag probability distribution $p^{OOB}$ is input to each of the random forest trees. Let $C_k(p^{OOB})$ represent the class prediction of the k-th random forest tree (i.e., $C_k(p^{OOB}) \in \{0, 1\}$). The class prediction for the random forest model is given by majority vote $C_{rf0}^K$ 2202. For example, if the random forest model produces more "0" class labels than "1" class labels, the random forest model predicts a "0" class label for the out-of-the-bag probability distribution $p^{OOB}$. In FIG. 22B, black internal node 2204 of the random forest tree $T_K$ corresponds to the event-type probability that has been randomly changed to a different value. Comparison of the path represented by directional arrows in the random forest tree $T_K$ in FIG. 22A with the path in the random forest tree $T_K$ FIG. 22B reveals that the class label of the out-of-the bag probability distribution $p^{OOB}$ may have changed. The majority vote $C_{rf}^K$ 2206 is determined for the out-of-the-bag probability distribution $p^{OOB}$. In this example, the model score 2208 is an absolute difference between unchanged random forest model and the permuted random forest model. The model score 2208 is compared to a model score threshold denoted by $Th_{score}$. For example, the model score threshold may be set to zero, one, two, or three. If the model score 2208 is greater than a model score threshold, $Th_{score}$, then event type is considered important because the change in the event-type probability of the event type changed the majority vote of the random forest model. On the other hand, if the model score 2208 is less than $Th_{score}$, then the event type is considered unimportant and is discarded because the variation in the event-type probability of the event type did not create a change the majority vote of the random forest model. The process is repeated for another event type until all event types have been considered. The unimportant event types are removed and not considered.

Certain important event types that pass permutation feature importance described above may not reveal useful information about the root cause of a problem. In FIG. 3, the analytics engine 312 sends the important event types and corresponding log messages to the user interface 302. The user interface 302 produces a graphical user interface ("GUI") in a display device, such as the console of a system administrator. The GUI displays the important event types and corresponding log messages. The GUI includes fields that enable a user to view the log messages associated with the important event types and select which of the important event types reveal useful information about the probable root cause of a problem and discard important event types that do not. Event-type probabilities of important event types that are selected for removal are not included in training a final random forest model. The set of important event types is denoted by $E^I = \{et_a, et_b, \ldots, et_q\}$. The set of important event types $E^I$ excludes redundant event types and other important even types that do not reveal useful information about the probable root cause of a performance problem.

FIG. 23 shows an example GUI 2302 that displays the important event types and corresponding most recently generated log messages. A user can use the scroll bar 2304 to scroll up and down to view other event types and log messages not shown. For example, event type $et_{19}$ 2306 represents corresponding log message 2308. In this example, the left-hand column of the GUI 2302 enables a user select event types for removal. For example, the log messages of the event types $et_{19}$, $et_7$, and $et_{48}$ do not contain descriptions of problems or are not associated with problems. By contrast, event types $et_{14}$, $et_{50}$, and $et_{42}$ describe problems. For example, the log message of event type $et_{14}$ describes a problem created by a client closing the stream unexpectedly, the log message of the event type $et_{50}$ describes a problem created by an ESXi host that suddenly failed, and the log message of the event type $et_{42}$ describes a problem created by an ESXi host that is non-responsive. As shown in FIG. 23, the GUI 2302 enables a user to select important event types that do not describe probable root causes of a problem to be removed. The user can then select to training the final random forest model by clicking on button 2310 using the event-type probabilities of the unselected event types. In another implementation, the GUI may enable a user to select event types for training the final random forest model. The important event types that reveal use information about the probable root cause of the performance problem are added to the set of important event types $E^I$.

The analytics engine 312 applies rule learning to the final random forest model to obtain rules that identify anomalous states of runtime probability distributions. The rules can be obtained using repeated incremental pruning to produce error reduction ("RIPPER") as described in "Fast effective rule induction," by W. Cohen, Proc. Twelfth International Conference on Machine Learning, Tahoe City, California, July 9-12, pp. 115-123, 1995, which is herein incorporated by reference. RIPPER is an automated computer implemented process that finds regularities in event-type probability distributions in the form of an if <condition> then <predicted class>rules. RIPPER defines the positive class (anomalous class labels) in terms of simple or compound rules and ignores the negative class (normal class labels).

Figure 24A:
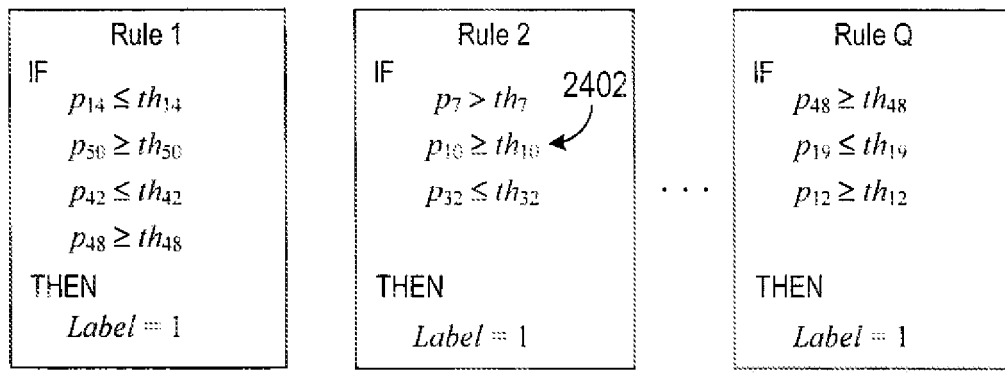
FIG. 24A shows examples of rules output from the RIPPER automated rule generating process.

FIG. 24A shows examples of rules output from the RIPPER automated rule generating process. A probability distribution with event-type probabilities that satisfy conditional statements of a rule is assigned the anomalous class label which corresponds to the performance problem. For example, Rule 2 is defined by three conditional statements 2402. When the event-type probabilities $p_7$, $p_{10}$, and $p_{32}$ of a probability distribution satisfy the three conditional statements 2402, the combination of log messages of the corresponding event types $et_7$, $et_{10}$, and $et_{32}$ most likely describe the root cause of a problem.

In another implementation, CN2 rule learning can be used to construct rules as describe in Foundation of Rule Learning, by J. Fürnkranz, D. Gamberger, N. Lavrac, Springer-Verlag, 2012, which is herein incorporated by reference. The CN2 rule learning is an automated classification technique designed for the efficient induction of rules of the form "if <condition> then <predicted class>." CN2 can explain both normal and anomaly states.

Figure 24B:
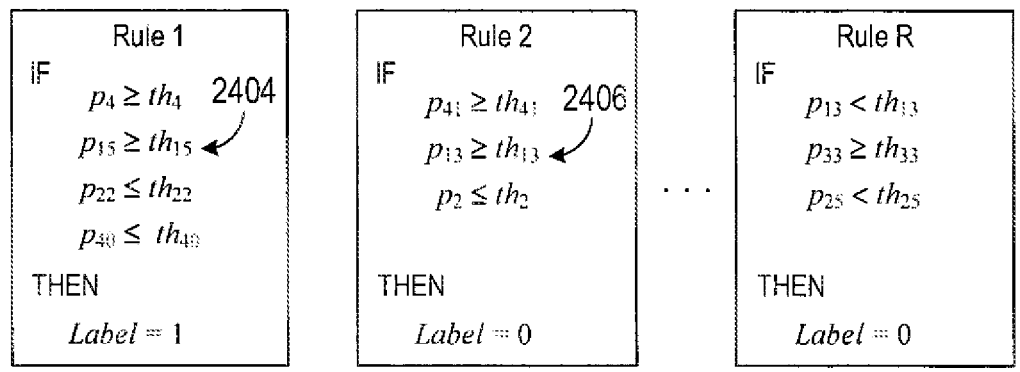
FIG. 24B shows examples of rules output from the CN2 automated rule generating process.

FIG. 24B shows examples of rules output from the CN2 automated rule generating process. A probability distribution with event-type probabilities that satisfy conditional statements of a rule is assigned the anomalous class label "1," which corresponds to the performance problem, or is assigned the normal class label "0," which correspond to normal behavior. For example, Rule 1 is defined by four conditional statements 2404. When the event-type probabilities $p_4$, $p_{15}$, $p_{22}$ and $p_{40}$ of a probability distribution satisfy the four conditional statements 2404, the combination of log messages of the corresponding event types $et_4$, $et_{15}$, $et_{22}$ and $et_{40}$ most likely describe the root cause of a problem. On the other hand, Rule 2 is defined by three conditional statements 2406. When the event-type probabilities $p_{41}$, $p_{13}$, and $p_2$ of a probability distribution satisfy the three conditional statements 2404, the object is exhibiting normal behavior.

The conditional statements of the rules are used to detect the important event-type probabilities that correspond to run-time KPI threshold violations. The important event types of log messages generated in a run-time time interval of a run-time KPI violation are extracted. The combination of log messages describe the probable root cause of the KPI threshold violation.

Performance problems with a data center object can originate from the data center infrastructure and/or the objects itself. While an object is executing in the data center, the analytics engine 312 computes KPIs of the object and compares run-time KPI values to corresponding KPI thresholds to detect a run-time performance problem as described above. In response to a run-time KPI value violating a corresponding KPI threshold, the analytics engine 312 sends an alert notification to the controller 310 that a KPI threshold violation has occurred and the controller 310 directs the user interface 302 to display an alert in GUI of a system administrators console or monitor. The analytics engine 312 determines log messages that describe the probable root cause of performance problem of a data center object.

Figure 25A:
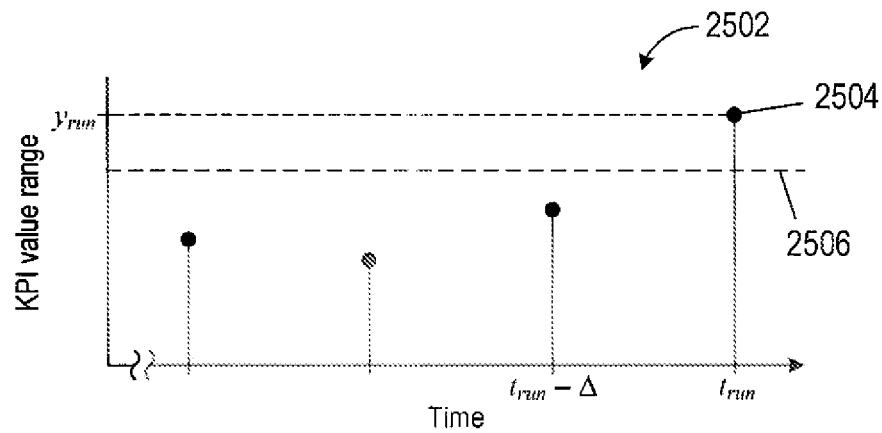
FIGS. 25A-25B show an example of determining log messages that describe the probable root cause of a performance problem associated with a data center object.
Figure 25B:
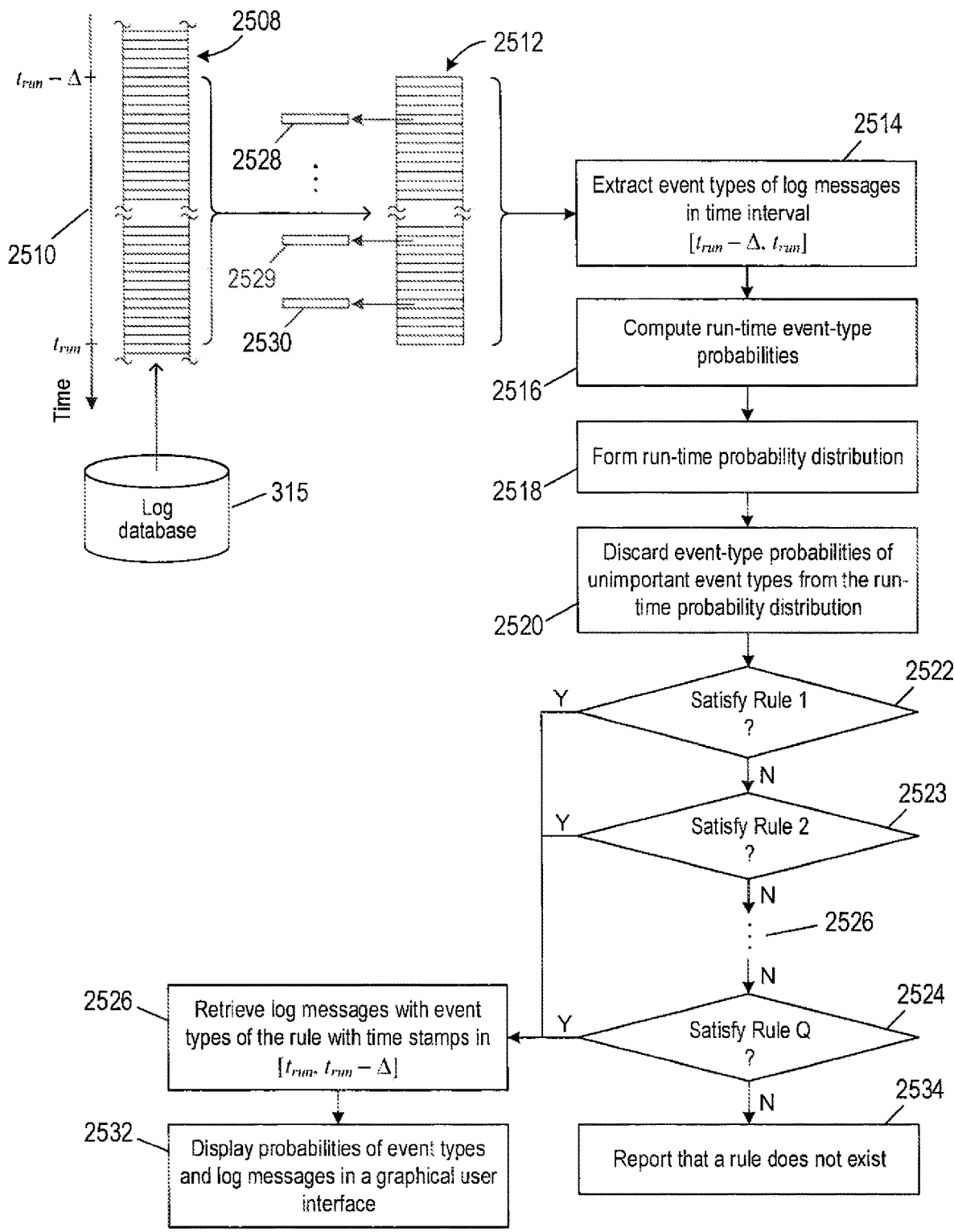

FIGS. 25A-25B show an example of determining log messages that describe the probable root cause of a performance problem associated with a data center object. FIG. 25A shows an example plot 2502 of KPI values of a KPI associated with the object. Solid dots represent KPI values. For example, solid dot 2504 represents a run-time KPI value, $y_{run}$, that exceeds a corresponding KPI threshold represented by dashed line 2506 at time $t_{run}$. The KPI violation of the threshold 2506 triggers the analytics engine 312 to send an alert notification to the controller 310 that the KPI threshold violation has occurred. The controller 310 directs the user interface 302 to display an alert in a GUI of a system administrators console or monitor. The alert identifies the KPI and object impacted by the performance problem in the GUI. The analytics engine 312 starts the process of troubleshooting the problem indicated by the KPI violation by extracting the log messages that describe events occurring in a run-time interval that ends at the time $t_{ru}$ of the KPI threshold violation.

FIG. 25B shows a portion of a log file 2508 stored in the log database 315. The log file 2508 contains log messages of the object recorded in a preceding time interval $[t_{run}-\Delta, t_{run}]$ 7510, where $\Delta$ represents the amount of time between the runtime KPI value and the previous KPI value. The analytics engine 312 extracts log messages 2512 with time stamps in the preceding time interval $[t_{run}-\Delta, t_{run}]$ 2510 from the log file 2508. In block 2514, the event type engine 306 extracts event types from the log messages 2512 with time stamps in the time interval $[t_{run}-\Delta, t_{run}]$ 2510. In block 2516, the analytics engine 312 computes event-type probabilities for each of the N event types:

$$p_{rn} = \frac{n(et_m)}{N} \quad (10)$$

where the subscript "r" denotes run time. In block 2518, the analytics engine 312 forms a probability distribution of the event types:

$$P_r = (p_{r1}, p_{r2}, \ldots, p_{r,N-1}, p_{rN}) \quad (11)$$

In block 2520, the analytics engine 312 discards event-type probabilities of redundant and unimportant event types and retains only event-type probabilities of the set of important event types $E^I$ to obtain run-time important event-type probabilities given by:

$$P_r^{imp} = (p_{ra}, p_{rb}, \ldots, p_{rq}) \quad (12)$$

In decision blocks 2522-2524, the analytics engine 312 applies the conditional statements of the rules to the event-type probabilities in Equation (12) in order to detect one or more importance event types that correspond to problem with the KPI. Ellipsis 2526 represents rules that are not represented for convenience. For example, the rules in the decision blocks 2522-2524 may correspond to the rules in FIG. 24A. When the event-type probabilities of the $p_r^{imp}$ satisfy all of the conditional statements of any one the rules in decision blocks 2522-2524, control flows to block 2526. In block 2526, the analytics engine 312 extracts the log messages associated with each of the event types of the event-type probabilities that satisfy one of the rules. Rectangles 2528-2530 represent log messages that correspond to the event types of the event-type probabilities that satisfy the conditional statements of one the rules. In block 2532, the log messages are displayed in the GUI of a display device, such as the system administrator console or monitor. In block 2534, when none of the rules are satisfied, a message indicating that a rule does not exist for the KPI threshold violation is displayed in the GUI.

Figure 26A:
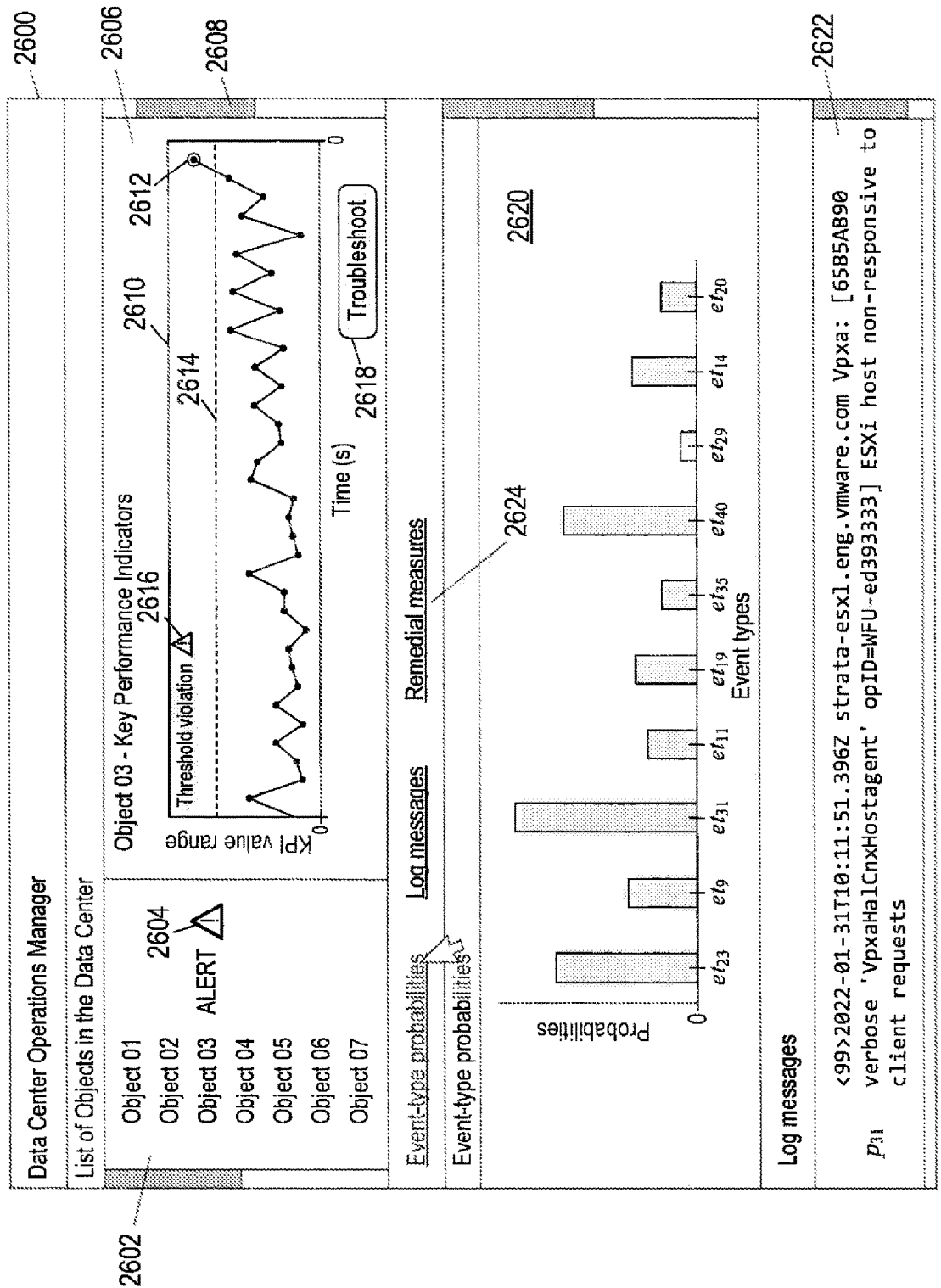
FIGS. 26A-26B show an example graphical use interface that displays a list of objects, KPI threshold violations, log messages, and remedial measures.

FIG. 26A shows an example GUI 2600 that displays a list of objects executing in a data center in a left-hand pane 2602. Each object may have numerous KPIs that are used to monitor different aspects of the performance of an object as described above. In this example, the object identified as "Object 03" has an associated alert 2604. A user may click on the highlighted area around Object 03, creating plots of the KPIs associated with Object 03 in a right-hand pane 2606. In this example, a user has used the scroll bar 2608 to scroll to a plot 2610 of a KPI exhibiting the alert that corresponds to a KPI value 2612 that violates a KPI threshold 2614. In this example, an alert 2616 is displayed in the plot 2610. Each KPI has an associated troubleshoot button. In this example, a user clicks on the troubleshoot button 2618 to start the troubleshooting process of the KPI. In response to receiving the troubleshoot command from the user interface 302, the analytics engine 312 executes the operations described above with reference to FIG. 25B (and below with reference to FIGS. 28-31) to obtain log messages that describe the probable root cause of the performance problem indicated by the KPI threshold violation. The GUI 2600 includes a pane 2620 that displays a plot of the event-type probabilities of the important event types. The GUI 2600 includes a pane 2622 in which the log messages of the importance event types are displayed. A user is able to scroll through the log messages and identify the log messages that reveal the root cause of the problem. The user clicks on the "remedial measures" button 2624 to display remedial measures associated with the probable root cause of the problem.

Figure 26B:
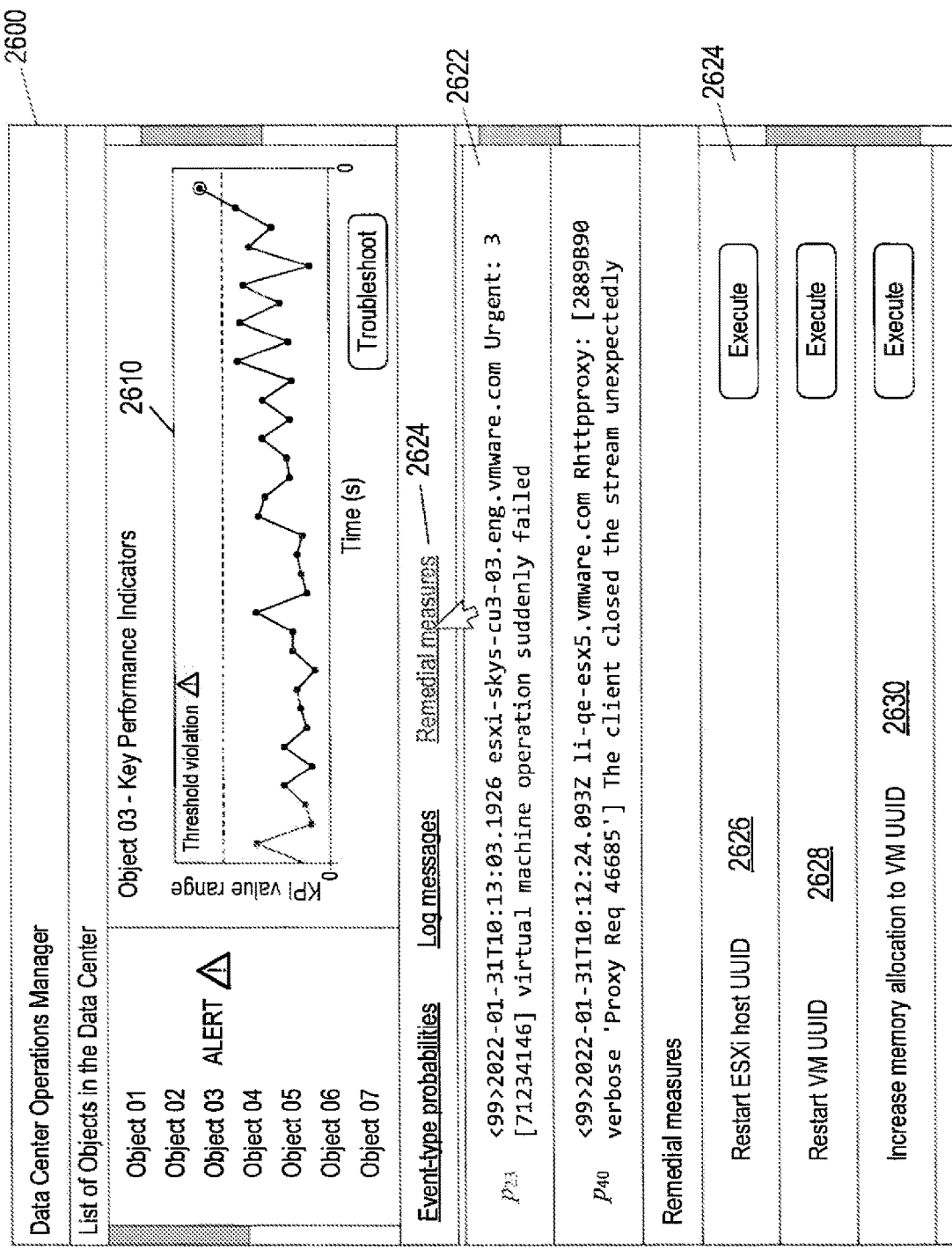

FIG. 26B shows a remedial measures pane 2626 displayed in the GUI 2600 in response to a user clicking on the "remedial measures" button 2624. Remedial measures include restarting the host 2626, restarting the VM 2628, and increasing memory allocation to the VM 2630, where UUID denotes the universal unique identity of the object. A user can automatically execute the remedial measure by clicking on the corresponding "Execute" buttons. Other remedial measure that may be executed to correct the problem with the object include, but are not limited to, powering down hosts, replacing VMs disabled by physical hardware problems and failures, spinning up cloned VMs on additional hosts to ensure that the microservices provided by the VMs are accessible to increasing demand for services. When an alert is generated indicating inadequate virtual processor capacity, remedial measures that increase the virtual processor capacity of the virtual object may be executed or the virtual object may be migrated to a different server computer with more processor capacity.

Figure 27:
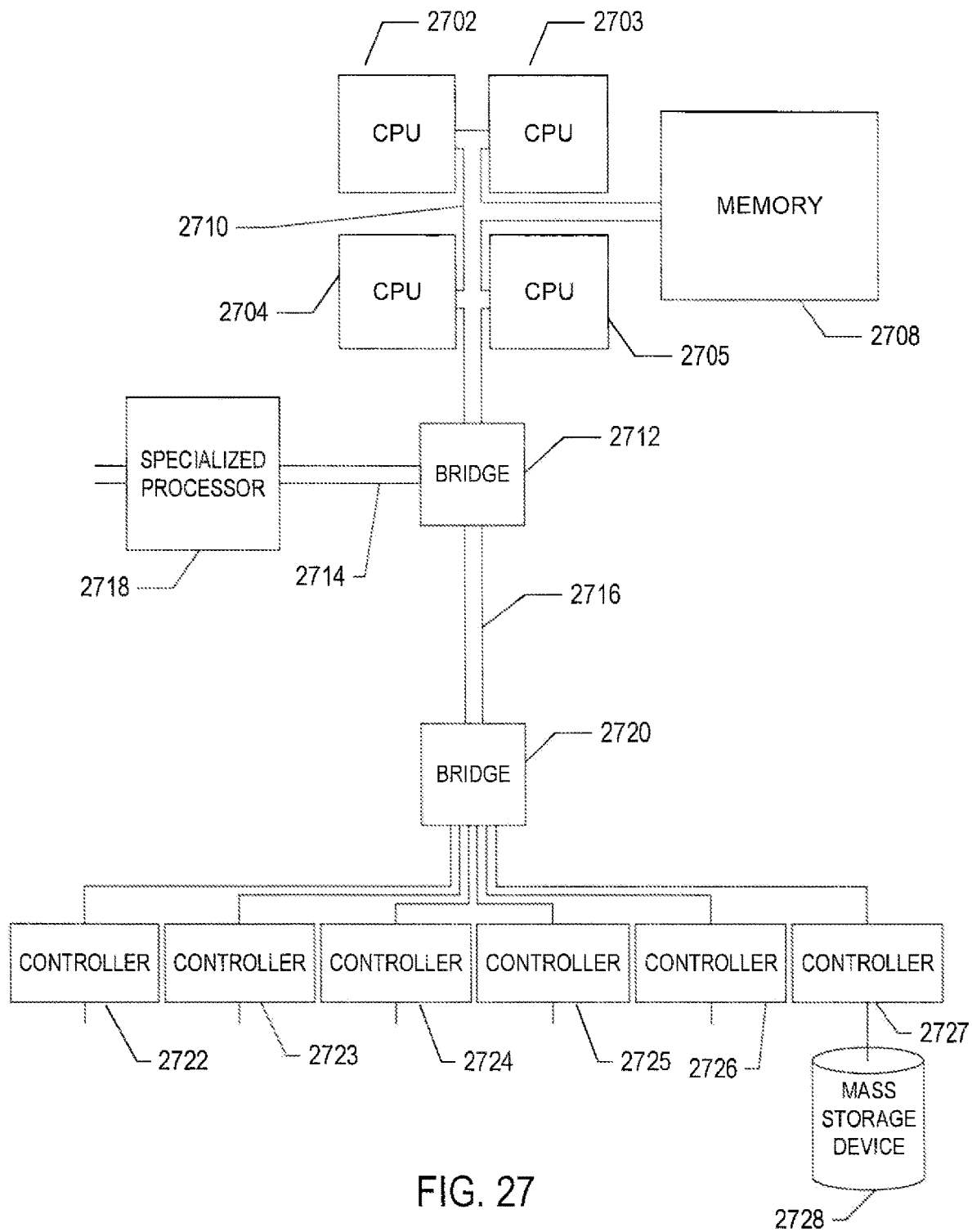
FIG. 27 shows an example architecture of a computer system that performs automated processes for resolving performance problems with objects executing in a data center.

FIG. 27 shows an example architecture of a computer system that may be used to host the operations manager 132 and perform the automated processes for resolving performance problems with objects executing in a data center. The computer system contains one or multiple central processing units ("CPUs") 2702-2705, one or more electronic memories 2708 interconnected with the CPUs by a CPU/memory-subsystem bus 2710 or multiple busses, a first bridge 2712 that interconnects the CPU/memory-subsystem bus 2710 with additional busses 2714 and 2716, or other types of high-speed interconnection media, including multiple, high-speed serial interconnects. The busses or serial interconnections, in turn, connect the CPUs and memory with specialized processors, such as a graphics processor 2718, and with one or more additional bridges 2720, which are interconnected with high-speed serial links or with multiple controllers 2722-2727, such as controller 2727, that provide access to various different types of computer-readable media, such as computer-readable medium 2728, electronic display devices, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer readable medium 2728 is a data-storage device, which may include, for example, electronic memory, optical or magnetic disk drive, a magnetic tape drive, USB drive, flash memory and any other such data-storage device or devices. The computer-readable medium 2728 is used to store machine-readable instructions that encode the computational methods of the operations manager 132.

The automated computer-implemented process described herein eliminates human errors in detecting probable root causes of a performance problem of an object executing in a data center. The process significantly reduces the amount time spent detecting probable root causes. The time reduction may be from days and weeks to minutes and seconds, thereby providing immediate notification of a performance problem, providing at least one probable root cause, thereby enabling rapid execution of remedial measures that correct the problem.

The methods described below with reference to FIGS. 28-31 are stored in one or more data-storage devices as machine-readable instructions that when executed by one or more processors of a computer system, such as the computer system shown in FIG. 27, determine the potential root causes of a performance problem with an object executing in a data center.

Figure 28:
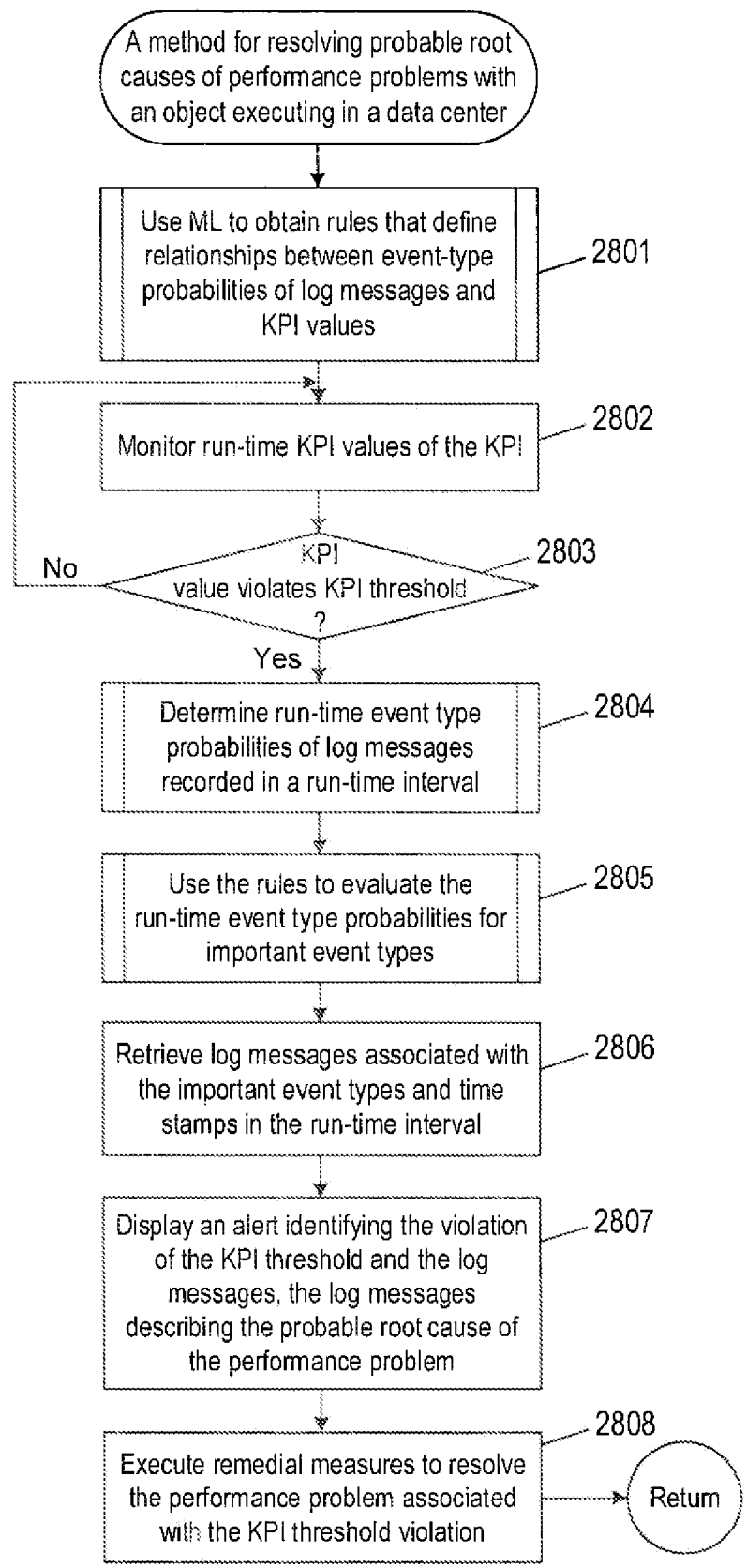
FIG. 28 is a flow diagram illustrating an example implementation of a method for resolving probable root causes of performance problems with an object executing in a data center.

FIG. 28 is a flow diagram illustrating an example implementation of a method for resolving probable root causes of performance problems with an object executing in a data center. In block 2801, a "use machine learning ("ML") to obtain rules that define relationships between event-type probabilities of log messages and KPI values" procedure is performed. An example implementation of the "use machine learning ("ML") to obtain rules that define relationships between event-type probabilities of log messages and KPI values" is described below with reference to FIG. 29. In block 2802, run-time KPI values of the KPI are monitored for KPI threshold violations. In decision block 2803, in response to a run-time KPI value violating the KPI threshold, control flows to block 2804. In block 2804, a "determine run-time event-type probabilities of log messages recorded in a run-time interval" procedure is performed. An example implementation of the "determine run-time event-type probabilities of log messages recorded in a run-time interval" is described below with reference to FIG. 30. In block 2805, a "use the rules to evaluate the run-time event-type probabilities for important event types" procedure is performed. An example implementation of the "use the rules to evaluate the run-time event-type probabilities for important event types" is described below with reference to FIG. 31. In block 2806, log messages associated with the important event types and time stamps in the run-time interval are retrieved from the log database 315. In block 2807, an alert identifying the violation of the KPI threshold and the log messages are displayed in a graphical user interface of an electronic display device as described above with reference to FIGS. 26A-26B. The log messages describe the probable root cause of the performance problem. In block 2808, remedial measures to resolve the performance problem associated with the KPI threshold violation detected in block 2803 are executed. The remedial measures include, but are not limited to, restarting a host, restarting a VM, increasing memory or CPU allocation to the VM. Other remedial measures include replacing VMs disabled by physical hardware problems and failures, spinning up cloned VMs on additional hosts to ensure that the microservices provided by the VMs are accessible to increasing demand for services, and migrating VMs to other hosts.

Figure 29:
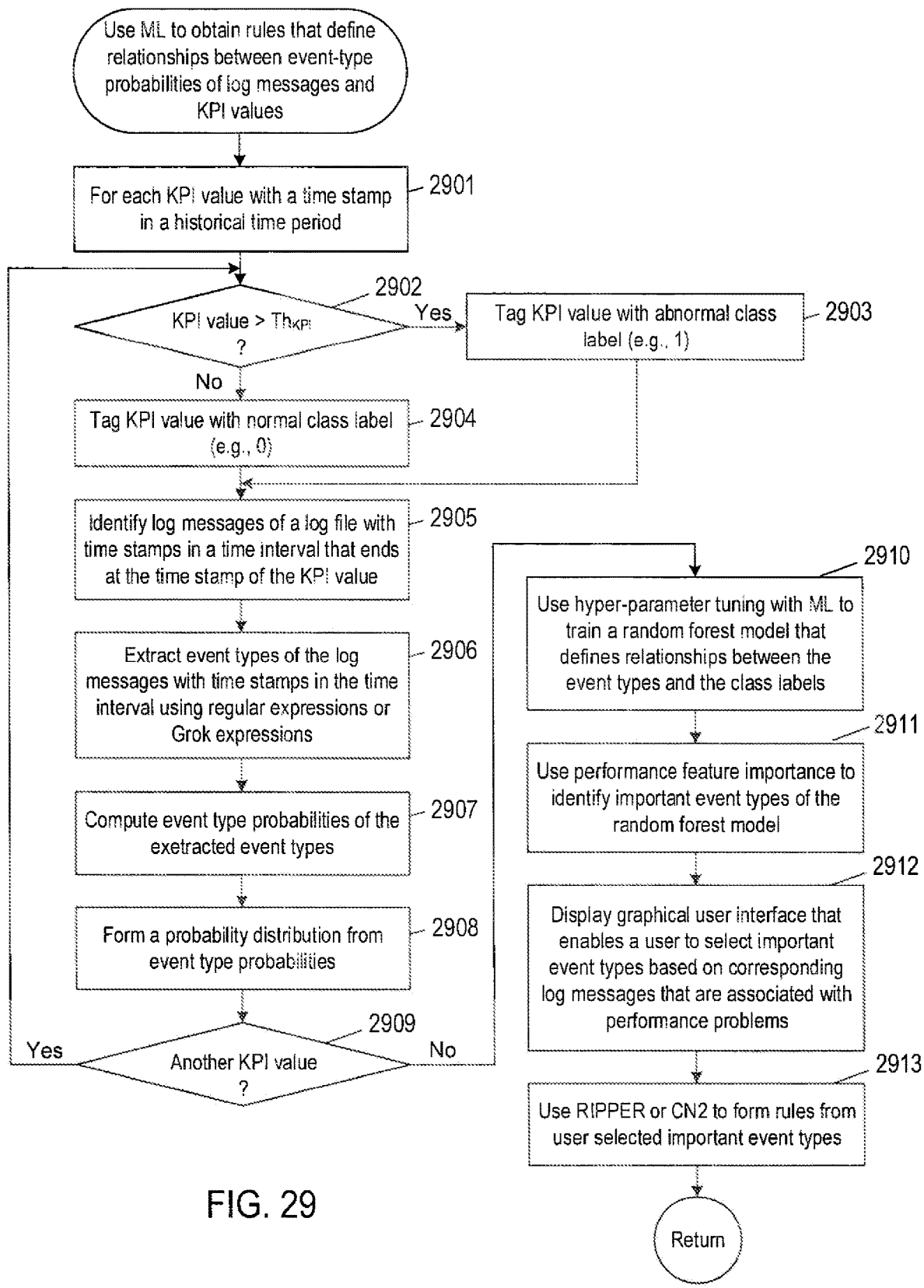
FIG. 29 is a flow diagram illustrating an example implementation of the "use machine learning ("ML") to obtain rules that define relationships between event-type probabilities of log messages and KPI values" procedure performed in FIG. 28.

FIG. 29 is a flow diagram illustrating an example implementation of the "use machine learning ("ML") to obtain rules that define relationships between event-type probabilities of log messages and KPI values" procedure performed in block 2801 of FIG. 28. A loop beginning with block 2901 repeats the computational operations represented by blocks 2902-2908 for each KPI value in a historical time period. In decision block 2902, in response to a KPI value violating a KPI threshold, control flows to block 2903 in which the KPI value is an outlier and is tagged with a class label "1" as described above with reference to FIG. 10B. Otherwise, control flows to block 2904 in which the KPI value is normal and is tagged with a class label "0" as described above with reference to FIG. 10B. In block 2905, log messages of a log file with time stamps in a time interval that ends with the time stamp of the KPI value are identified as described above with reference to FIG. 11. In block 2906, event types of the log messages with time stamps in the time interval are extracted as described above with reference to FIGS. 9A-9C. In block 2907, event-type probabilities of the extracted event types are computed as described above with reference to Equation (5). In block 2908, a probability distribution is formed as described above with reference to Equation (6). In decision block 2909, if another KPI value is available in the historical time period, control flows to decision block 2902, Otherwise control flows to block 2910. In block 2910, hyperparameter tuning with ML is used to train a random forest model that defines relationships between the event types and the class labels as described above with reference to the pseudocode and FIGS. 13A-20. In block 2911, performance feature importance is used to identify important event types of the random forest models as described above reference to FIGS. 21-22. In block 2912, a graphical user interface is displayed that enables a user to select important event types based on corresponding log messages that are associated with performance problems as described above with reference to FIG. 23. In block 2913, a rule learning technique, such as RIPPER or CN2, as used to form rules as described above with reference to FIGS. 24A-24B.

Figure 30:
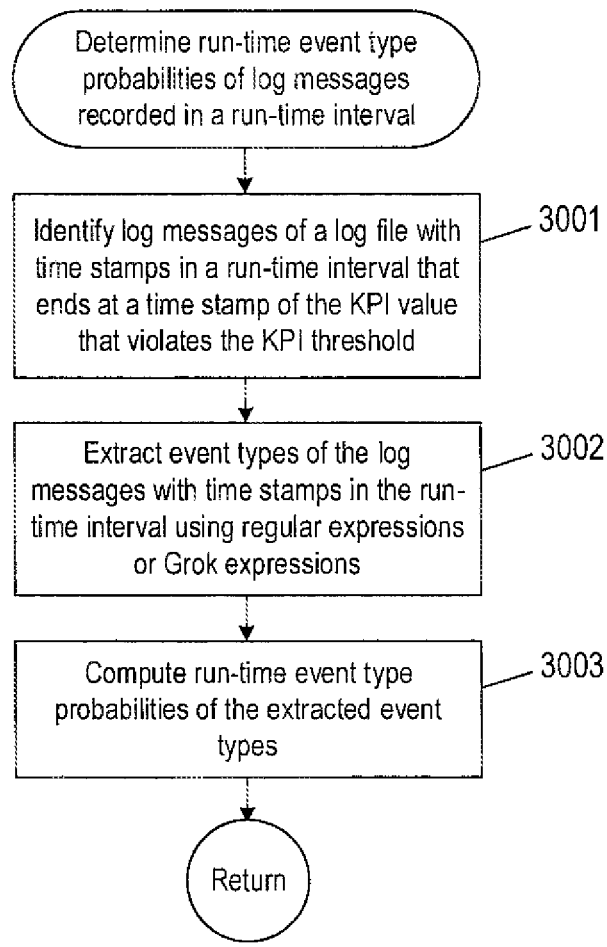
FIG. 30 is a flow diagram illustrating an example implementation of the "determine run-time event-type probabilities of log messages recorded in a run-time interval" procedure performed in FIG. 28.

FIG. 30 is a flow diagram illustrating an example implementation of the "determine run-time event-type probabilities of log messages recorded in a run-time interval" procedure performed in block 2804 of FIG. 28. In block 3001, log messages of a log file with time stamps in a run-time interval that ends at a time stamp of the KPI value that violates the KPK threshold are identified. In block 3002, event types of the log messages identified in block 3001 are extracted as described above with reference to FIG. 25B. In block 3003, run-time event-type probabilities of the extracted event types are computed as described above with reference to Equations (10) and (11).

Figure 31:
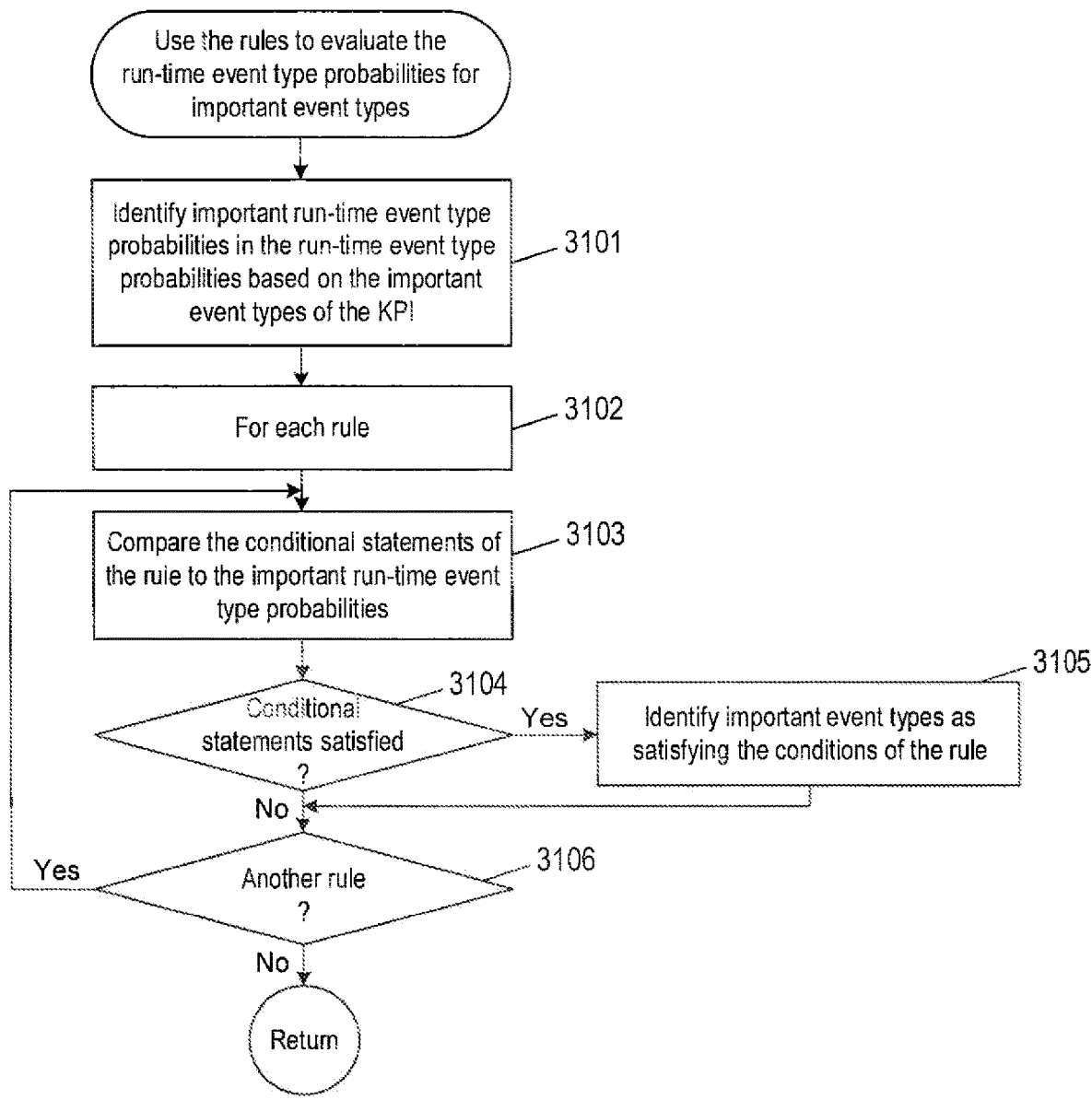
FIG. 31 is a flow diagram illustrating an example implementation of the "use the rules to evaluate the run-time event-type probabilities for important event types" procedure performed in FIG. 28.

FIG. 31 is a flow diagram illustrating an example implementation of the "use the rules to evaluate the run-time event-type probabilities for important event types" procedure performed in block 2805 of FIG. 28. In block 3101, important run-time event-type probabilities in the run-time event-type probabilities are identified based on the important event types of the KPI identified in block 2912 of FIG. 29. A loop beginning with block 3102 repeats the computational operations represented by blocks 3102-3105 for each of the rules obtained in block 2913. In block 3103, the important run-time even type distributions are compared against the conditional statements of the rule. In decision block 3104, in response to the conditional statements being satisfied, control flows to block 3105. In block 3105, the important event types of the important event-type probabilities that satisfy the conditional statements of the rule are identified. In decision block 3106, blocks 3103-3105 are repeated for another rule.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method, stored in one or more data-storage devices and executed using one or more processors of a computer system, for resolving probable root causes of performance problems with an object executing in a data center, the method comprising:
   using machine learning to obtain rules that define relationships between probabilities of event types of log messages and values of a key performance indictor ("KPI");
   in response to detecting a run-time KPI violation of a KPI threshold, determining probabilities of event types of log messages recorded in a run-time interval that ends with the time of the run-time KPI violation;
   using the rules to determine important event types of the event-type probabilities in the run-time interval:
   retrieving log messages from a log database, the retrieved log messages corresponding to the important event types and describe probable root causes of the performance problems; and
   executing remedial measures that resolve the performance problems with the object based on the retrieved log messages, the remedial measures including restarting a host, restarting the object, adjusting memory or CPU allocation to the object, and migrating virtual objects to different hosts.

2. The method of claim 1 wherein using machine learning to obtain rules comprises:
   for each KPI in a historical time period repeat operations comprising:
      tagging KPI values that violate a KPI threshold with a first class label;
      tagging KPI values that do not violate the KPI threshold with second class label;
      identifying log messages of a log file with time stamps in a time interval that ends with a time stamp of the KPI value;
      extracting event types of the log messages with time stamps in the time interval;
      computing event-type probabilities of the extracted event types; and
      forming a probability distribution from the event-type probabilities.

3. The method of claim 2 further comprising:
   using hyperparameter tuning with machine learning to train a random forest model that defines relationships between the event types and the class labels;
   using performance feature importance to identify important event types of the random forest models;
   displaying a graphical user interface that enables a user to select important event types based on corresponding log messages that are associated with performance problems; and
   using rule learning to form the rules.

4. The method of claim 1 wherein determining probabilities of event types of the log messages recorded in the run-time interval comprises:
   identifying log messages of a log file with time stamps in the run-time interval that ends at a time stamp of the KPI value that violates the KPK threshold;
   extracting event types of the log messages; and
   computing run-time event-type probabilities of the extracted event types in the run-time interval.

5. The method of claim 1 wherein using the rules to evaluate the event-type probabilities for important event types comprises:
   identifying important run-time event-type probabilities in the run-time event-type probabilities based on important event types; and
   for each of the rules of the model repeat operations comprising:
      comparing the important run-time even type distributions to the conditional statements of the rule, and
      in response to the conditional statements being satisfied, identifying the important event types of the important event-type probabilities that satisfy the conditional statements of the rule.

6. A computer system for resolving probable root causes of performance problems with an object executing in a data center, the computer system comprising:
   one or more processors;
   one or more data-storage devices; and
   machine-readable instructions stored in the one or more data-storage devices that when executed using the one or more processors control the system to performance operations comprising:
      using machine learning to obtain rules that define relationships between probabilities of event types of log messages and values of a key performance indictor ("KPI");
      in response to detecting a run-time KPI violation of a KPI threshold, determining probabilities of event types of log messages recorded in a run-time interval that ends with the time of the run-time KPI violation;
      using the rules to determine important event types of the event-type probabilities in the run-time interval:
      retrieving log messages from a log database, the retrieved log messages corresponding to the important event types and describe probable root causes of the performance problems; and
      executing remedial measures that resolve the performance problems with the object based on the retrieved log messages, the remedial measures including restarting a host, restarting the object, adjusting memory or CPU allocation to the object, and migrating virtual objects to different hosts.

7. The system of claim 6 wherein using machine learning to obtain rules comprises:
   for each KPI in a historical time period repeat operations comprising:
      tagging KPI values that violate a KPI threshold with a first class label;
      tagging KPI values that do not violate the KPI threshold with second class label;
      identifying log messages of a log file with time stamps in a time interval that ends with a time stamp of the KPI value;
      extracting event types of the log messages with time stamps in the time interval;
      computing event-type probabilities of the extracted event types; and
      forming a probability distribution from the event-type probabilities.

8. The system of claim 7 further comprising:
   using hyperparameter tuning with machine learning to train a random forest model that defines relationships between the event types and the class labels;

using performance feature importance to identify important event types of the random forest models;
displaying a graphical user interface that enables a user to select important event types based on corresponding log messages that are associated with performance problems; and
using rule learning to form the rules.

9. The system of claim 6 wherein determining probabilities of event types of the log messages recorded in the run-time interval comprises:
identifying log messages of a log file with time stamps in the run-time interval that ends at a time stamp of the KPI value that violates the KPK threshold;
extracting event types of the log messages; and
computing run-time event-type probabilities of the extracted event types in the run-time interval.

10. The system of claim 6 wherein using the rules to evaluate the event-type probabilities for important event types comprises:
identifying important run-time event-type probabilities in the run-time event-type probabilities based on important event types; and
for each of the rules of the model repeat operations comprising:
comparing the important run-time even type distributions to the conditional statements of the rule, and
in response to the conditional statements being satisfied, identifying the important event types of the important event-type probabilities that satisfy the conditional statements of the rule.

11. A non-transitory computer-readable medium having instructions encoded thereon for enabling one or more processors of a computer system to perform operations comprising:
using machine learning to obtain rules that define relationships between probabilities of event types of log messages and values of a key performance indictor ("KPI");
in response to detecting a run-time KPI violation of a KPI threshold, determining probabilities of event types of log messages recorded in a run-time interval that ends with the time of the run-time KPI violation;
using the rules to determine important event types of the event-type probabilities in the run-time interval;
retrieving log messages from a log database, the retrieved log messages corresponding to the important event types and describe probable root causes of the performance problems; and
executing remedial measures that resolve the performance problems with the object based on the retrieved log messages, the remedial measures including restarting a host, restarting the object, adjusting memory or CPU allocation to the object, and migrating virtual objects to different hosts.

12. The medium of claim 11 wherein using machine learning to obtain rules comprises:
for each KPI in a historical time period repeat operations comprising:
tagging KPI values that violate a KPI threshold with a first class label;
tagging KPI values that do not violate the KPI threshold with second class label;
identifying log messages of a log file with time stamps in a time interval that ends with a time stamp of the KPI value;
extracting event types of the log messages with time stamps in the time interval;
computing event-type probabilities of the extracted event types; and
forming a probability distribution from the event-type probabilities.

13. The medium of claim 12 further comprising:
using hyperparameter tuning with machine learning to train a random forest model that defines relationships between the event types and the class labels;
using performance feature importance to identify important event types of the random forest models;
displaying a graphical user interface that enables a user to select important event types based on corresponding log messages that are associated with performance problems; and
using rule learning to form the rules.

14. The medium of claim 11 wherein determining probabilities of event types of the log messages recorded in the run-time interval comprises:
identifying log messages of a log file with time stamps in the run-time interval that ends at a time stamp of the KPI value that violates the KPK threshold;
extracting event types of the log messages; and
computing run-time event-type probabilities of the extracted event types in the run-time interval.

15. The medium of claim 11 wherein using the rules to evaluate the event-type probabilities for important event types comprises:
identifying important run-time event-type probabilities in the run-time event-type probabilities based on important event types; and
for each of the rules of the model repeat operations comprising:
comparing the important run-time even type distributions to the conditional statements of the rule, and
in response to the conditional statements being satisfied, identifying the important event types of the important event-type probabilities that satisfy the conditional statements of the rule.

* * * * *